(12) United States Patent
Cho et al.

(10) Patent No.: US 10,341,529 B2
(45) Date of Patent: Jul. 2, 2019

(54) TERMINAL AND CONTROLLING METHOD THEREOF

(71) Applicant: LG ELECTRONICS INC., Seoul (KR)

(72) Inventors: Taehoon Cho, Seoul (KR); Arim Kwon, Seoul (KR); Changmok Kim, Seoul (KR); Juhye Lee, Seoul (KR); Yujune Jang, Seoul (KR); Junghoon Chu, Seoul (KR); Juha Hyun, Seoul (KR); Eunhye Kim, Seoul (KR); Srujana Vundigala, Seoul (KR); Venketesh Babu Sankaranarayanan, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/695,631

(22) Filed: Sep. 5, 2017

(65) Prior Publication Data
US 2018/0069983 A1  Mar. 8, 2018

(30) Foreign Application Priority Data

Sep. 6, 2016 (KR) .......... 10-2016-0114483
Oct. 4, 2016 (KR) .......... 10-2016-0127432

(51) Int. Cl.
| | |
|---|---|
| *H04N 5/232* | (2006.01) |
| *H04N 1/393* | (2006.01) |
| *G06F 16/957* | (2019.01) |
| *G06F 3/0481* | (2013.01) |
| *G06F 3/0488* | (2013.01) |

(Continued)

(52) U.S. Cl.
CPC .......... *H04N 1/3935* (2013.01); *G06F 3/0481* (2013.01); *G06F 3/04886* (2013.01); *G06F 16/9577* (2019.01); *G06T 3/4007* (2013.01); *H04B 1/401* (2013.01); *H04M 1/72583* (2013.01); *H04N 5/23216* (2013.01); *H04N 5/23293* (2013.01); *H04N 5/23296* (2013.01); *G06F 2203/04806* (2013.01); *G09G 2340/045* (2013.01)

(58) Field of Classification Search
CPC ............. H04N 1/3935; H04N 5/23296; H04N 5/23216; H04N 5/23293; G06T 3/4007; G06F 3/04886; G06F 3/0481; G06F 17/30905; G06F 2203/04806; H04M 1/72583; H04B 1/401; G09G 2340/045
USPC ....................... 348/333.01–333.09
See application file for complete search history.

(56) References Cited

U.S. PATENT DOCUMENTS

2009/0153649 A1* 6/2009 Hirooka ............ H04N 5/23212
                                                            348/47
2010/0232704 A1* 9/2010 Thorn ................ G06F 3/04845
                                                            382/195

(Continued)

*Primary Examiner* — Yogesh K Aggarwal
(74) *Attorney, Agent, or Firm* — Birch, Stewart, Kolasch & Birch, LLP

(57) ABSTRACT

Disclosed are a terminal and controlling method thereof. The present invention includes displaying a preview image captured through a camera, obtaining an input for selecting an object from the displayed preview image, determining a smart zoom magnification for the selected object to be displayed in an optimal size, zoom-processing the preview image at the determined smart zoom magnification centering on the selected object, and displaying the zoom-processed preview image.

12 Claims, 37 Drawing Sheets

(51) Int. Cl.
*G06T 3/40* (2006.01)
*H04B 1/401* (2015.01)
*H04M 1/725* (2006.01)

(56) References Cited

U.S. PATENT DOCUMENTS

2016/0105615 A1    4/2016   Chang et al.
2016/0255268 A1*   9/2016   Kang ................ G06F 3/04845
                                                                         348/333.11

* cited by examiner

TERMINAL AND CONTROLLING METHOD THEREOF

Pursuant to 35 U.S.C. § 119(a), this application claims the benefit of earlier filing date and right of priority to Korean Application No. 10-2016-0114483, filed on Sep. 6, 2016 and Korean Application No. 10-2016-0127432, filed on Oct. 4, 2016, the contents of which are hereby incorporated by reference herein in their entirety.

BACKGROUND OF THE INVENTION

Field of the Invention

The present invention relates to a terminal, and more particularly, to a terminal and controlling method thereof. Although the present invention is suitable for a wide scope of applications, it is particularly suitable for enlarging or reducing an image.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, it is popular to record a video or capture an image using a terminal. As terminal performance is enhanced, a user can obtain a high-definition video or image shot using a terminal. Regarding the video or image shot, a difference between a terminal and a camera tends to decrease. In aspect of a video/image shot function, the terminal and the camera are regarded as the same device.

When a video or image is shot, a user may adjust a shot region through a zoom function to capture a desired video or image.

Only an optical zoom configured to use a focal distance variation according to a lens movement was used in the past. Yet, recently, a digital zoom capable of digital processing for enlarging a portion of a recently shot image data has been used popularly.

Particularly, a zoom performance of the optical zoom is developed fast owing to the developments of digital processing technologies and dual cameras. Since the optical zoom does not require a physical shift operation of a lens, it comes into wide use owing to the advantage of not requiring a complicated lens mechanism.

However, since a zoom function through a terminal or camera can zoom in or out centering on a center of a shot preview image only, it cause a problem that a user has difficulty in taking a desired image.

SUMMARY OF THE INVENTION

Accordingly, embodiments of the present invention are directed to a terminal and controlling method thereof that substantially obviate one or more problems due to limitations and disadvantages of the related art.

One object of the present invention is to provide a terminal and controlling method thereof, which can provide a zoom function centering on a selected subject.

Another object of the present invention is to provide a terminal and controlling method thereof, which can provide a magnification optimal for a selected subject.

Another object of the present invention is to provide a terminal and controlling method thereof, which can provide a preview image enlarged or reduced at a variable speed in response to a zoom input.

Further object of the present invention is to provide a terminal and controlling method thereof, which can provide various shot schemes centering on a selected subject.

Another further object of the present invention is to provide a terminal and controlling method thereof, which can provide a zoom function of zoom-processing a selected subject only.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal according to one embodiment of the present invention may include a display unit, a camera configured to capture an image, and a controller configured to display a preview image captured through the camera on the display unit, obtain an input for selecting an object from the displayed preview image, determine a smart zoom magnification for the selected object to be displayed in an optimal size on the display unit, zoom-process the preview image at the determined smart zoom magnification centering on the selected object, and control the zoom-processed preview image to be displayed on the display unit.

The controller may determine a maximal magnification for the selected object to be displayed in a maximal size on the display unit as the smart zoom magnification and zoom-process the preview image at the determined maximal magnification centering on the selected object.

The controller may display a smart zoom button for displaying the selected object in the optimal size on the display unit. If obtaining an input to the displayed smart zoom button, the controller may zoom-process the preview image at the determined maximal magnification centering on the selected object.

The controller may control an original preview image before the zoom processing to be displayed on a prescribed region of the display unit.

The controller may capture at least one of the zoom-processed image and the original preview image.

The camera may include a plurality of cameras configured to capture a same direction and the controller may perform the zoom processing based on a plurality of images respectively captured through a plurality of the cameras.

The controller may obtain an input for selecting a plurality of objects from the preview image and control a plurality of zoom regions respectively generated from zoom-processing a plurality of the selected objects to be displayed on the display unit.

The controller may simultaneously capture the zoom-processed image and each of a plurality of the zoom regions.

The controller may obtain an input for zooming in/out centering the selected object and perform a zoom processing at a variable speed in response to the obtained zoom-in/out input.

The controller may track the selected object in the captured preview image and control the display unit to display the selected object at a center of the zoom-processed preview image.

In another aspect of the present invention, as embodied and broadly described herein, a method of operating a terminal according to one embodiment of the present invention may include displaying a preview image captured through a camera, obtaining an input for selecting an object from the displayed preview image, determining a smart zoom magnification for the selected object to be displayed in an optimal size, zoom-processing the preview image at the determined smart zoom magnification centering on the selected object, and displaying the zoom-processed preview image.

In further aspect of the present invention, as embodied and broadly described herein, a terminal according to another embodiment of the present invention may include a display unit, a camera configured to capture an image, and a controller configured to display a preview image captured through the camera on the display unit, obtain an input for zooming in or out at least one object selected from the displayed preview image, zoom-process the selected at least one object only based on the obtained zoom-in/out input, and control the preview image having the selected at least one object zoom-processed therein only to be displayed on the display unit.

In another further aspect of the present invention, as embodied and broadly described herein, a method of operating a terminal according to another embodiment of the present invention may include displaying a preview image captured through a camera, obtaining an input for zooming in or out at least one object selected from the displayed preview image, zoom-processing the selected at least one object only based on the obtained zoom-in/out input, and displaying the preview image having the selected at least one object zoom-processed therein only.

Accordingly, embodiments of the present invention provide various effects and/or features.

First of all, a terminal according to an embodiment of the present invention can provide a zoom function centering on a selected subject, thereby enabling a user to capture a desired scene easily.

Secondly, the present invention can provide a magnification optimal for a selected subject and perform a zoom processing at an optimal magnification at a time, thereby enhancing user's zoom function usability.

Thirdly, the present invention can provide a preview image enlarged or reduced at a variable speed in response to a zoom input, thereby facilitating user's adjustment at a desired zoom magnification.

Fourthly, the present invention can provide various shot schemes centering on a selected subject, thereby enabling a user to capture various desired images.

Finally, a terminal according to an embodiment of the present invention can provide a zoom processing function of enlarging or reducing a selected subject only, thereby facilitating a user to capture a desired scene.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
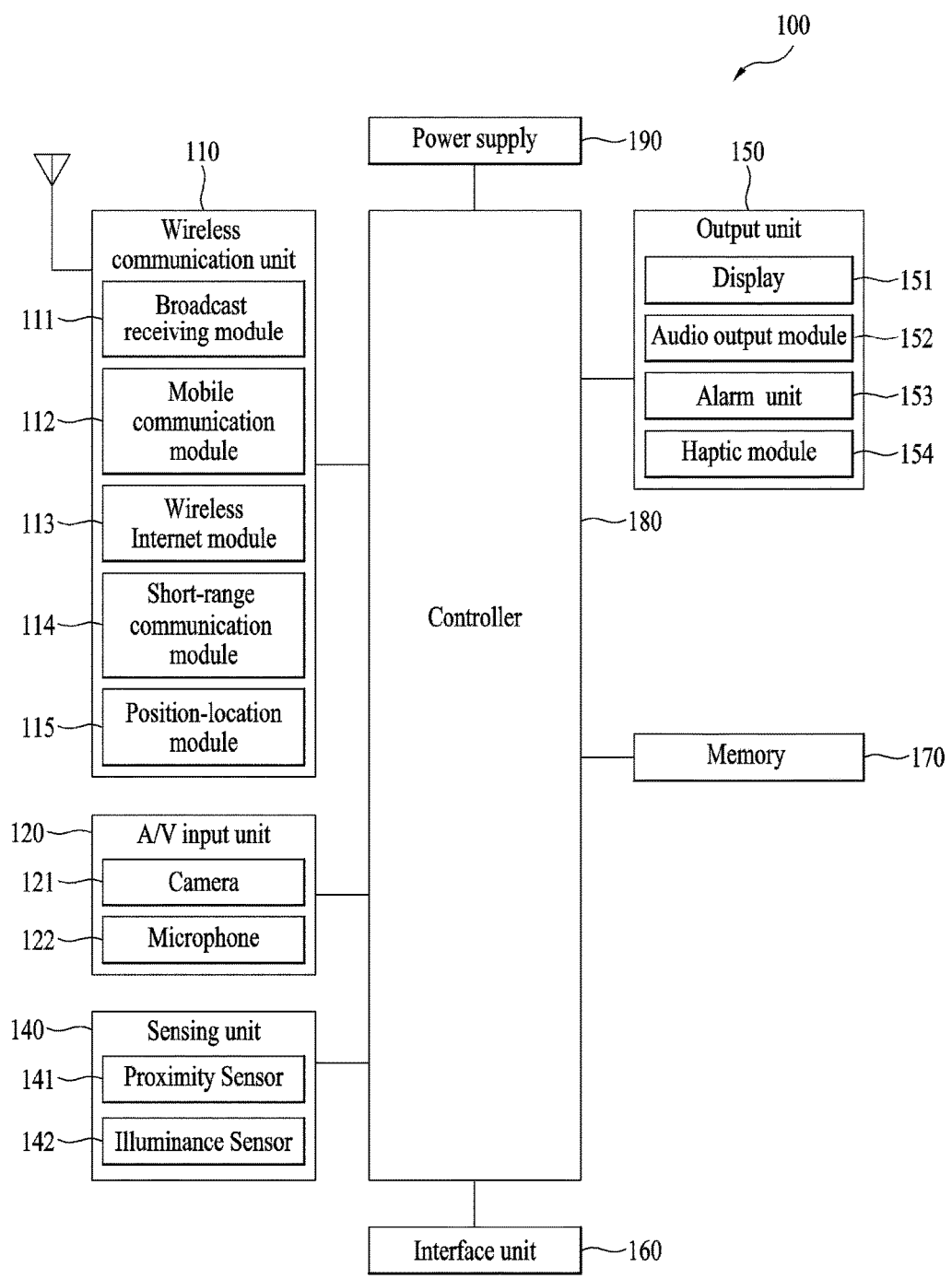
FIG. 1A is a block diagram to describe a terminal related to the present invention.
Figure 1B:
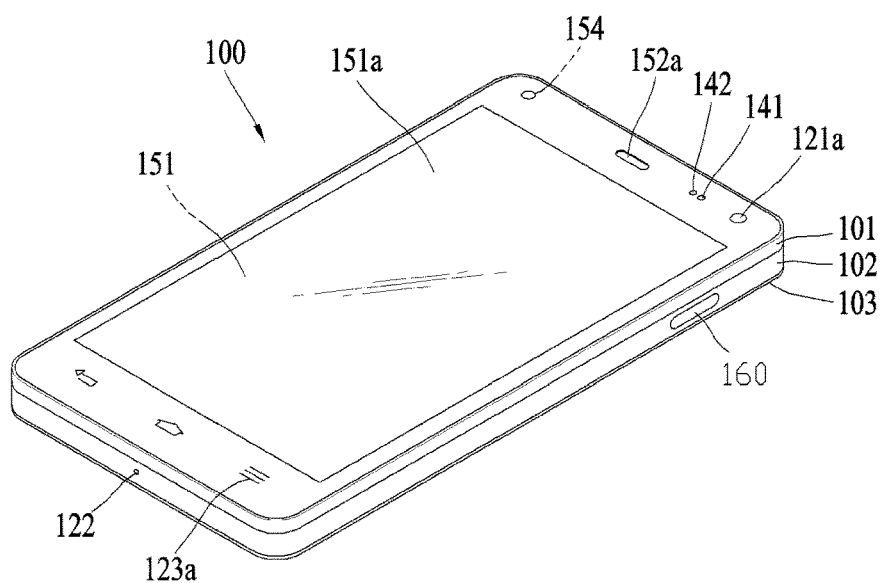
FIG. 1B and FIG. 1C are diagrams for the concept of one example of a terminal related to the present invention in different views, respectively.
Figure 1C:
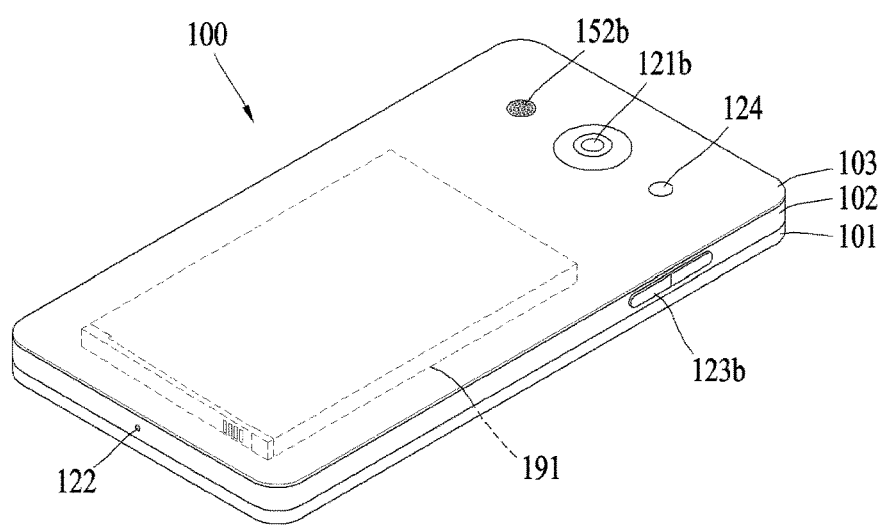

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A terminal 100 according to various embodiments of the present invention may be provided with a plurality of cameras on a prescribed side of the terminal. For instance, the terminal 100 may include a plurality of cameras provided to a front and/or rear side of the terminal. And, each of a plurality of the cameras may have a different field of view.

Figure 2:
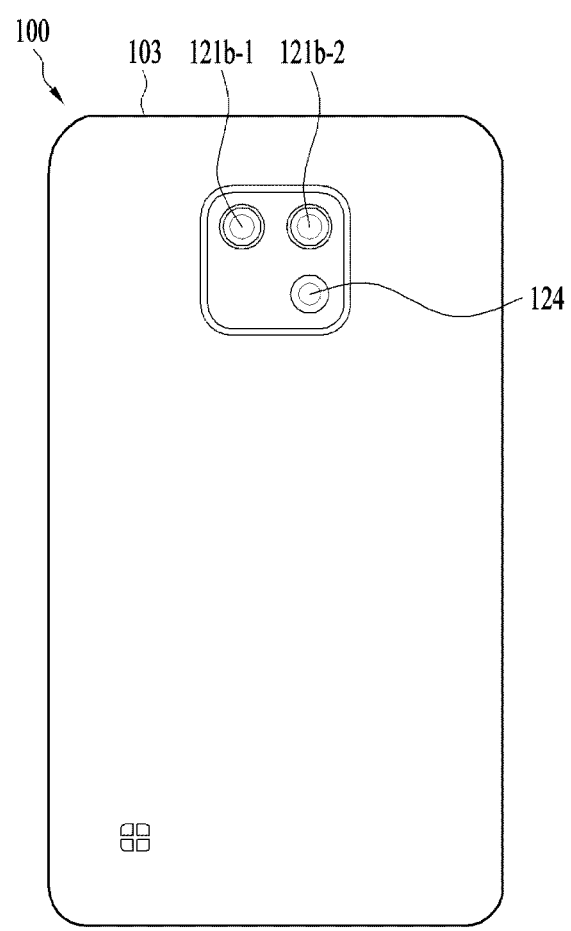
FIG. 2 is a diagram for a rear side of a terminal provided with a plurality of cameras according to various embodiments of the present invention.

FIG. 2 is a diagram for a rear side of a terminal provided with a plurality of cameras according to various embodiments of the present invention.

Referring to FIG. 2, a plurality of cameras including a third camera 121b-1 and a fourth camera 121b-2 may be provided to a rear side of the terminal 100. The third camera 121b-1 and the fourth camera 121b-2 may have different view fields, respectively. For instance, the third camera 121b-1 may have a normal view field and the fourth camera 121b-2 may have a view field of a wide angle. The third camera 121b-1 and the fourth camera 121b-2, included in a plurality of the cameras, may have different pixels, respectively.

The terminal 100 may obtain a plurality of images in a prescribed direction through a plurality of the cameras, and may perform an optical zoom processing based on a plurality of the obtained images. For instance, the controller 180 may create a single image from integrating a plurality of the images respectively captured by the third camera 121b-1 and the fourth camera 121b-2. The controller 180 may compare a plurality of images captured by a plurality of the cameras to each other and then create a single integrated image in a manner that a plurality of the compared images complement each other. The controller 180 may enlarge a portion of image data of the created image according to an optical zoom function. Herein, since the single image created from integrating a plurality of the images is a further detailed image of a quality better than that of each of a plurality of the images, the optical zoom processing for enlarging a portion of a created image can be performed.

The terminal 100 according to various embodiments of the present invention may provide a zoom function centering on a selected object from a preview image captured by the camera 121. The terminal 100 may provide a smart zoom for enlarging/reducing the selected object in optimal or maximal size, and may display a mini map at an original magnification. Moreover, the terminal 100 provides various shot schemes for a zoom function applied image. This is described in detail as follows.

Figure 3:
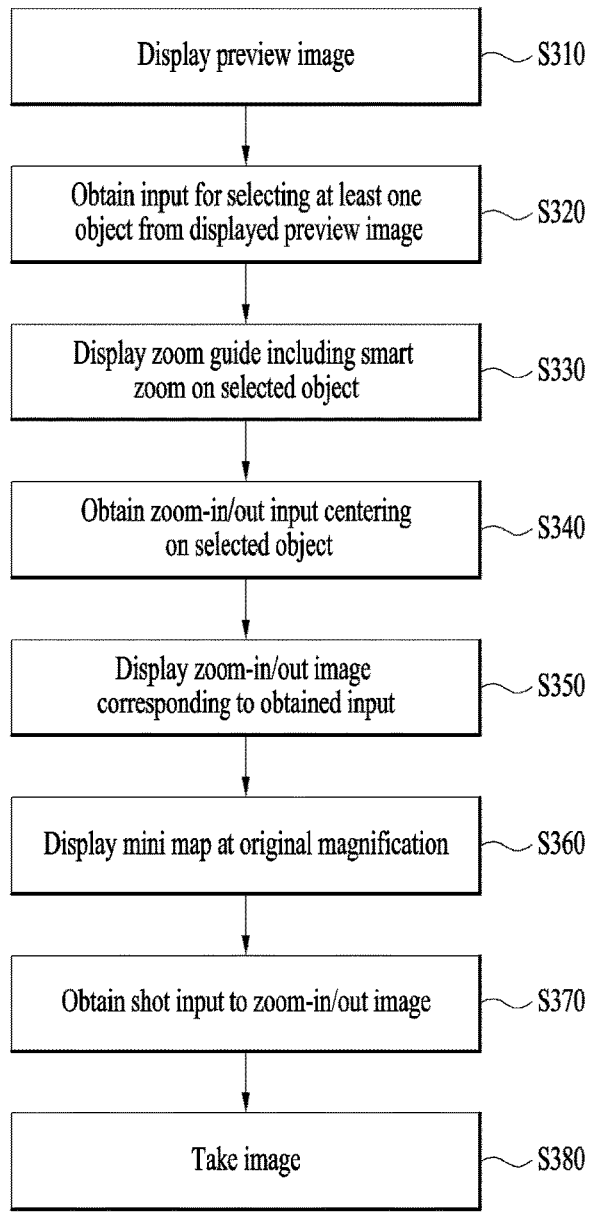
FIG. 3 is a flowchart for an operating method of a terminal according to various embodiments of the present invention.

FIG. 3 is a flowchart for an operating method of a terminal according to various embodiments of the present invention.

Referring to FIG. 3, the terminal 100 may display a preview image [S310].

The controller 180 of the terminal 100 may display a preview image taken through the camera 121 on the display unit 151. The controller 180 may display a single preview image for a plurality of images, which are taken through a plurality of cameras 121b-1 and 121b-2 for shots in a prescribed direction, on the display unit 151.

The terminal 100 may obtain an input for selecting at least one object from the displayed preview image [S320].

The controller 180 may obtain an input for selecting at least one object, which is to become a center of a zoom function operation, from the preview image displayed on the display unit 151. Herein, the selected object may include a single recognizable object or a prescribed point. And, the controller 180 may display a focus on the selected object. The controller 180 may display a different focus indicator according to a type of an object selection input.

The controller 180 may receive various inputs as an input for selecting at least one object from the displayed preview image. For instance, the controller 180 may obtain an input of short touching a prescribed point or region of the preview image displayed on the display unit 151 or an input of long touching a prescribed point or region as an input for selecting an object. For another instance, the controller 180 may obtain an input of applying a force touch to a prescribed point or region of the preview image displayed on the display unit 151 as an input for selecting an object. Herein, 'force touch' may mean an input of applying a touch over a predetermined force. Meanwhile, the controller 180 may perform a different function or operation in response to an object selection according to each of the aforementioned various inputs. This will be described later.

The terminal 100 may display a zoom guide including a smart zoom on the selected at least one object [S330].

The controller 180 may display a zoom guide including a smart zoom for zooming in on or out of the selected at least one object at a specific rate on the display unit 151. The smart zoom may mean a zoom-in or zoom-out function in order for a selected object to be displayed in a maximal or optimal size on a display region of the display unit 151. For instance, based on a size and rate of a selected object, the controller 180 can calculate a maximal or optimal size displayable on the display region of the display unit 151. For one example, based on an aspect ratio of a selected object and a screen rate of the display unit 151, the controller 180 can determine a zoom magnification for a selected object to be displayed on the display unit 151 optimally or maximally.

And, the controller 180 can provide the determined zoom magnification through the smart zoom. Moreover, the controller 180 may provide a user-preferred magnification through the smart zoom. For instance, the controller 180 can provide a user-set magnification or a magnification set by a manufacturer in the course of a manufacturing process through the smart zoom, or may provide a magnification frequently used by a user on the basis of user's zoom function use history through the smart zoom.

The controller 180 may display a magnification for zoom-in or zoom-out, a current magnification and the aforementioned smart zoom on the zoom guide. For instance, on the zoom guide displayed on a prescribed region of the display unit 151, the controller 180 may display a current magnification and a magnification unit according to the zoom function and also display a magnification corresponding to the smart zoom. The controller 180 may display the zoom guide in a slide form and perform a zoom-in/out operation, which will be described later, in response to an input to the zoom guide displayed in the slide form. The controller 180 may display a smart zoom button or key. If obtaining an input for selecting the displayed smart zoom button or key, the controller 180 may perform a zoom operation at a magnification corresponding to the smart zoom. This will be described later.

The terminal 100 may obtain a zoom-in/out input centering on the selected object [S340].

The terminal 100 may obtain a zoom-in/out input to the selected object. For instance, while a focus on the selected object is displayed, the controller 180 can obtain a pinch-in/out input as a zoom-in/out input. For another instance, through an input to the displayed zoom guide, the controller 180 may obtain a zoom-in/out input to a selected object. For detailed instance, from the zoom guide displayed in the slide form, the controller 180 can obtain an input of moving a slide bar as a zoom-in/out input. From the displayed zoom guide, the controller 180 may obtain an input of selecting a prescribed point as a zoom-in/out input. For instance, the controller 180 can obtain an input of selecting a specific magnification as a zoom-in/out input.

The terminal 100 may display a zoom-in/out image corresponding to the obtained input [S350].

In response to the obtained input, the terminal 100 may perform a zoom-in/out processing centering on the selected object and then display the zoom-in/out processed image on the display unit 151. For instance, using a digital zoom function, the controller 180 may perform a zoom-in/out processing centering on the selected object and then display the zoom-in/out processed image on the display unit 151. For another instance, using an optical zoom function for controlling the camera 121, the controller 180 may perform a zoom-in/out processing centering on the selected object and then display the zoom-in/out processed image on the display unit 151.

The terminal 100 may perform a zoom-in/out processing linearly or nonlinearly in response to a zoom-in/out input. For instance, the controller 180 can apply a variable speed to a zoom-in/out input and may display a variable speed applied zoom-in/out processed image on the display unit 151.

Detailed embodiments for the above description are described with reference to FIG. 4 and FIG. 5.

Figure 4:
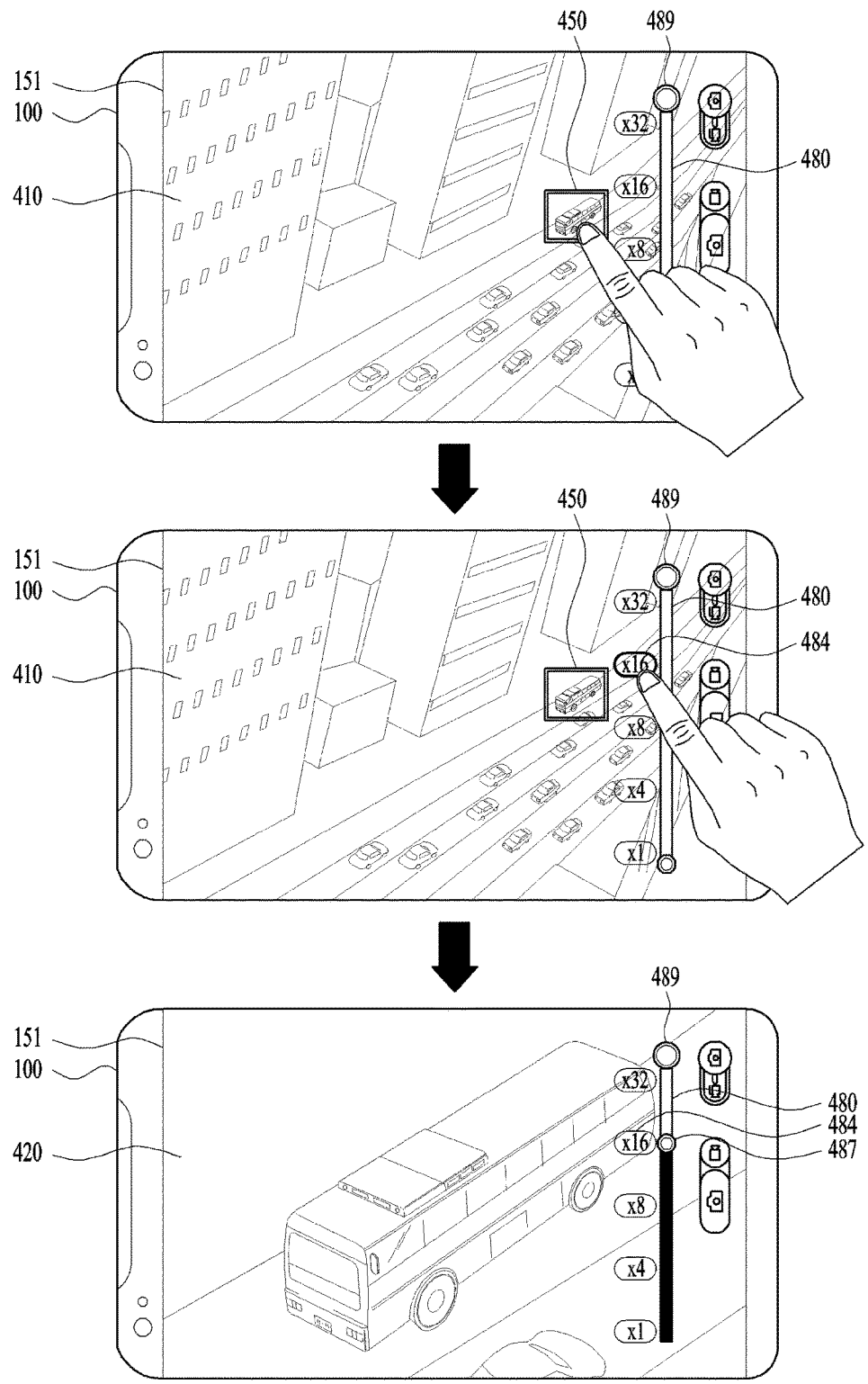
FIG. 4 is a diagram for an example of a zoom-in operation centering on a selected object according to various embodiments of the present invention.

FIG. 4 is a diagram for an example of a zoom-in operation centering on a selected object according to various embodiments of the present invention.

Referring to FIG. 4, the controller 180 of the terminal 100 may display a preview image 410 taken through the camera 121 on the display unit 151. The controller 180 may obtain an input for selecting a single object from the preview image 410 and display a focus on the selected object 450. And, the controller 180 may display a zoom slide 480 for zoom-in/out. The controller 180 may determine an optimal magnification for the selected object 450 and display a smart zoom button 489 for applying a smart zoom corresponding to the determined optimal magnification on the zoom slide 480. Herein, the optimal magnification corresponding to the smart zoom may include a magnification capable of displaying the selected object 450 in a maximal size displayable on the display unit 151. If obtaining an input for selecting a prescribed magnification from magnifications displayed on the slide 480, the controller 180 may display an image 420 zoom-processed at the selected magnification on the display unit 151 centering on the selected object (or subject) 450. If obtaining an input for moving the slide bar 487, the controller 180 may display the zoom-processed image 450 at the corresponding magnification on the display unit 151. For instance, if obtaining an input for selecting a magnification of 16 (×16) or an input for moving the slide bar 487 to a location corresponding to the ×16, the controller 180 can display an ×16 enlarged image 420 on the display unit 151 centering on the selected subject 450. Thus, the terminal 100 cam perform the zoom-in/out processing centering on the selected subject and display the zoom-in/out processed image.

Figure 5:
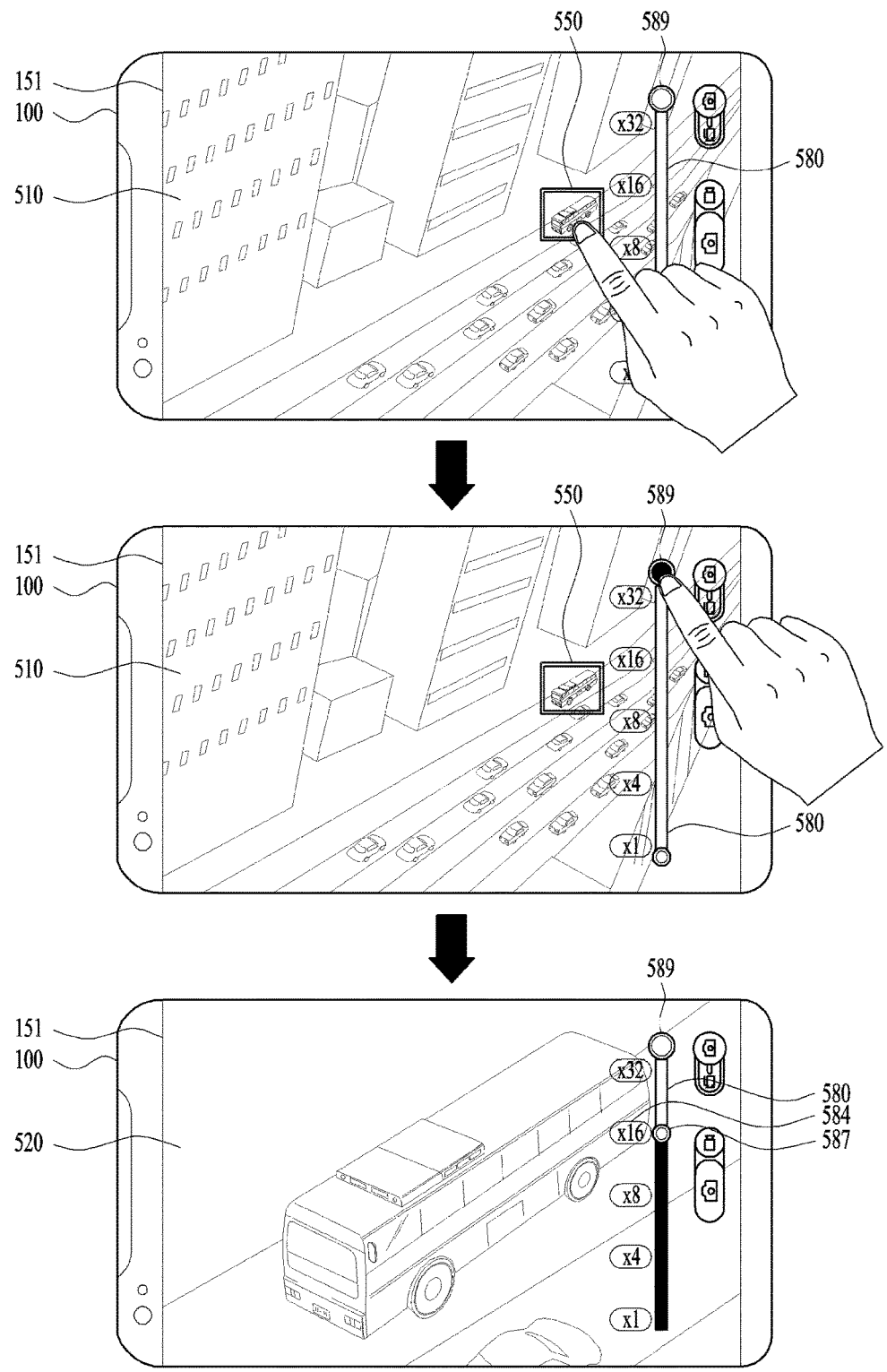
FIG. 5 is a diagram for an example of a smart zoom according to various embodiments of the present invention.

FIG. 5 is a diagram for an example of a smart zoom according to various embodiments of the present invention.

Referring to FIG. 5, the controller 180 of the terminal 100 may display a preview image 510 taken through the camera 121 on the display unit 151. The controller 180 may obtain an input for selecting a single object from the preview image 510 and display a focus on the selected object 550. And, the controller 180 may display a zoom slide 580 for zoom-in/out. The controller 180 may determine an optimal magnification for the selected object 550 and display a smart zoom button 589 for applying a smart zoom corresponding to the determined optimal magnification on the zoom slide 580. Herein, the optimal magnification corresponding to the smart zoom may include a magnification capable of displaying the selected object 550 in a maximal size displayable on the display unit 151, and can include a magnification of 16 for example. If obtaining an input for selecting the smart zoom button 589 displayed on the zoom slide 580, the controller 180 may display an image 520 enlarged at a magnification corresponding to the smart zoom, e.g., a magnification of 16 (i.e., ×16) on the display unit 151 centering on the selected object (or subject) 550. And, the controller 180 may display a slide bar 587 of the zoom slide 580 displayed on the enlarged image 520 at a location corresponding to a current magnification '×16'. Thus, the terminal 100 provides a smart zoom function corresponding to an optimal magnification for a selected subject, thereby enabling the selected subject to be displayed at the optimal magnification with a single input only.

The terminal 100 according to various embodiments of the present invention may apply a variable speed to an input for zoom-in/out. This is described with reference to FIG. 6.

Figure 6:
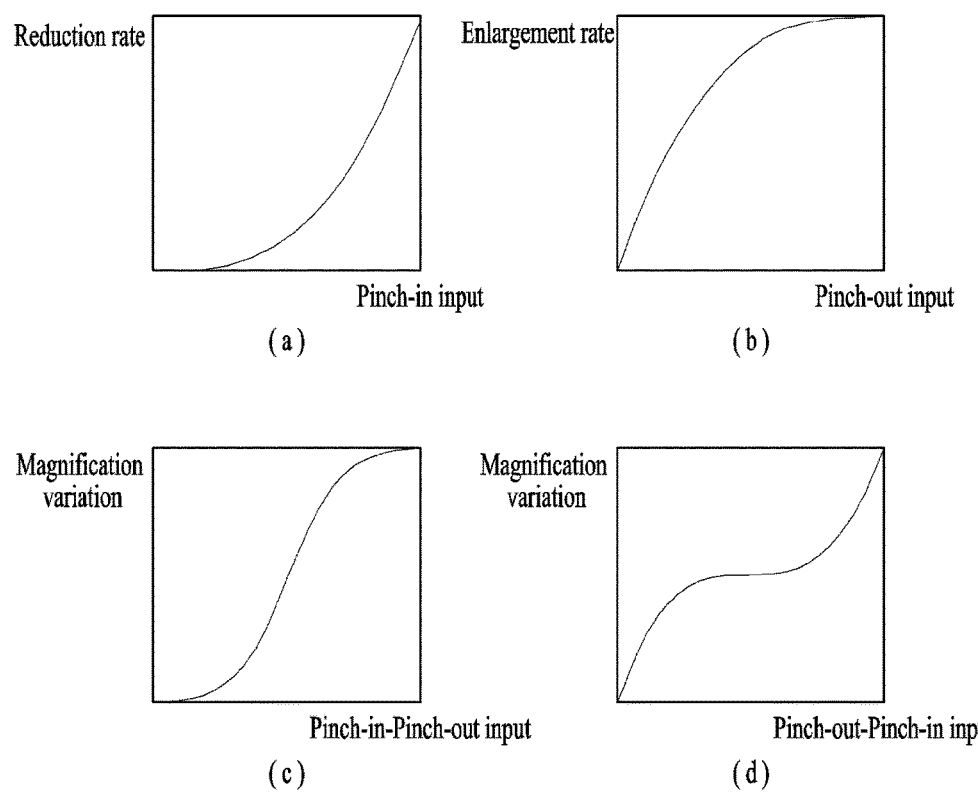
FIG. 6 is a graph of a variable speed applied zoom-in/out according to various embodiments of the present invention.

FIG. 6 is a graph of a variable speed applied zoom-in/out according to various embodiments of the present invention.

Referring to FIG. 6 (*a*), the terminal may nonlinearly apply a reduction magnification for a pinch-in input. For instance, the terminal 100 can increase a reduction magnification as a pinch-in input keeps being further inputted. For one example, if a distance between a plurality of pinch-in touch inputs gets shorter, the terminal 100 can gradually increase a reduction magnification applied in response to the input.

Referring to FIG. 6 (*b*), the terminal may nonlinearly apply an enlargement magnification for a pinch-out input. For instance, the terminal 100 can decrease an enlargement magnification as a pinch-out input keeps being further inputted. For one example, if a distance between a plurality of pinch-out touch inputs gets longer, the terminal 100 can gradually decrease an enlargement magnification applied in response to the input.

Referring to FIG. 6 (*c*), the terminal 100 may nonlinearly apply a magnification change for a pinch-in/out input, e.g., a reduction/enlargement magnification. For instance, if a pinch-in input is inputted, the terminal 100 can increase a reduction magnification as a pinch-in input keeps being further inputted. For another instance, if a pinch-out input is inputted, the terminal 100 can decrease an enlargement magnification as a pinch-out input keeps being further inputted.

Referring to FIG. 6 (*d*), the terminal 100 may nonlinearly apply a magnification change for a pinch-in/out input, e.g., a reduction/enlargement magnification. For instance, if a pinch-out input is inputted, the terminal 100 can decrease an enlargement magnification as a pinch-out input keeps being further inputted. For another instance, if a pinch-in input is inputted, the terminal 100 can increase a reduction magnification as a pinch-in input keeps being further inputted.

As mentioned in the above description, the terminal 100 may process a zoom-in/out input nonlinearly. Therefore, the terminal 100 may complement limitation or restriction on an input of a zoom input through a touch input, thereby providing a user with an accurate zoom input mechanism.

The terminal 100 according to various embodiments of the present invention can display a focused subject on a center of a display region of the display unit 151. If the focused subject is moving, the terminal 100 can track the moving subject. And, the terminal 100 can display the tracked subject on the center of the display region of the display unit 151. This is described with reference to FIGS. 7 to 9.

Figure 7:
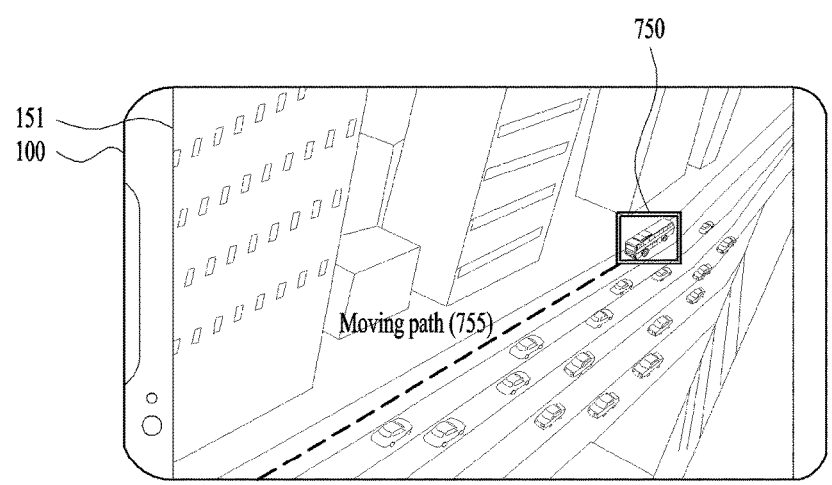
FIG. 7 is a diagram for an example of a subject tracking according to various embodiments of the present invention.

FIG. 7 is a diagram for an example of a subject tracking according to various embodiments of the present invention.

Referring to FIG. 7, the terminal 100 may display a preview image taken through the camera 121 on the display unit 151. The terminal 100 may obtain an input for selecting a prescribed subject 750 from the displayed preview image and mark the selected subject 750 with a focus indicator. If the selected subject 750 moves along a moving path 755, the terminal 100 can adjust the moving subject 750 to be displayed on a center of a display region of the display unit 151. Hence, although the selected subject 750 moves along the moving path 755, the terminal 100 can display the subject 750 in a manner of fixing the subject 750 to the center of the display region.

Figure 8:
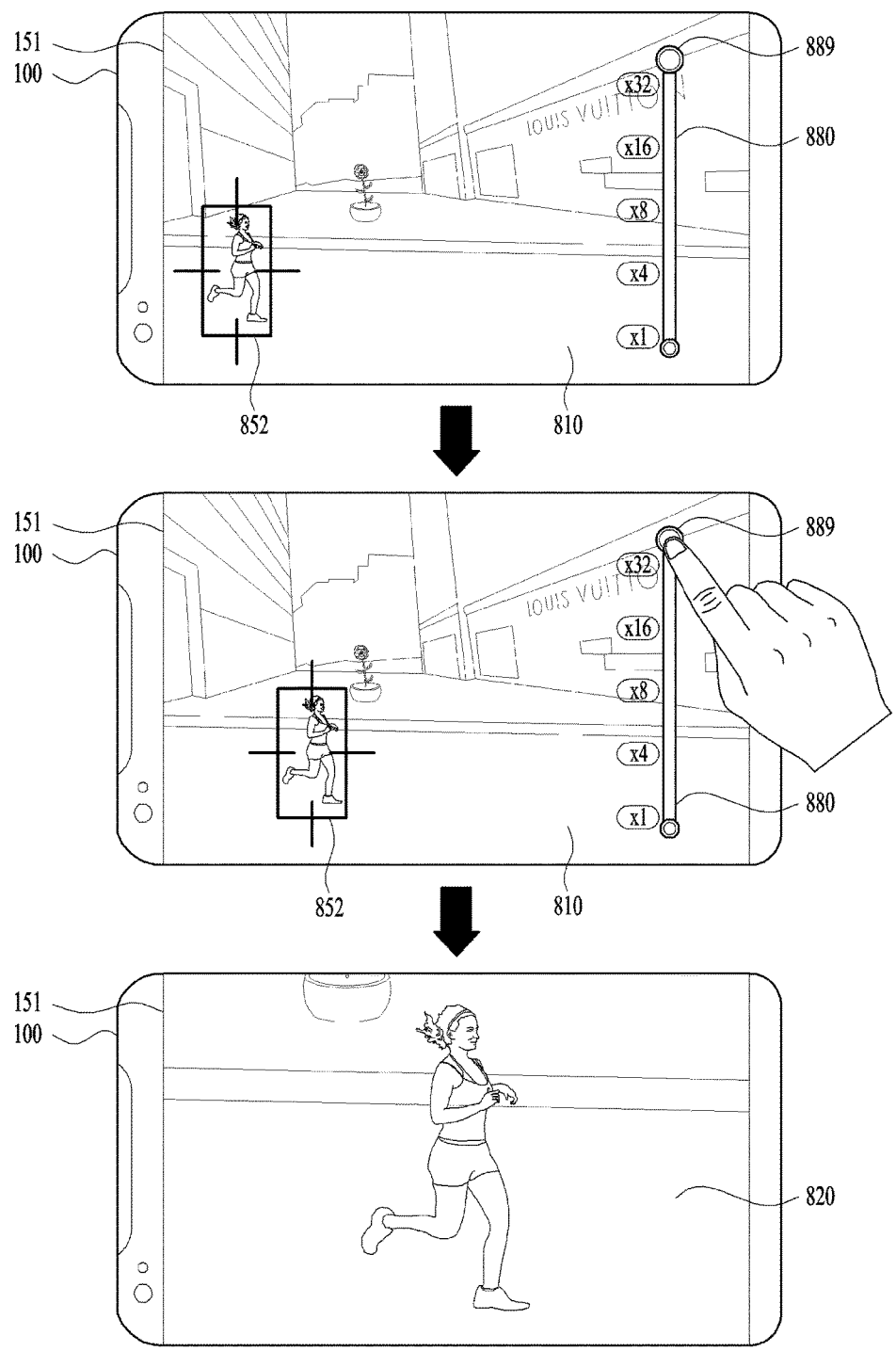
FIG. 8 is a diagram for an example of a subject fixed display according to various embodiments of the present invention.

FIG. 8 is a diagram for an example of a subject fixed display according to various embodiments of the present invention.

Referring to FIG. 8, the terminal 100 may display a preview image 810 taken through the camera 121 on the display unit 151. The terminal 100 may obtain an input for selecting a subject from the preview image and mark the selected subject 750 with a focus indicator. In response to the input for selecting the subject, the controller 180 may track the selected object continuously or discontinuously. Depending on the continuous or discontinuous tracking, the terminal 100 may display a different focus indicator. For instance, if the subject is touched long, the controller 180 can track the subject continuously and display a second focus indicator 852. The controller 180 may continuously track the selected subject and display the selected subject on a display region center of the display unit 151 despite that the selected subject is moving. The controller 180 may display a zoom slide 880 for the selected subject and also display a smart zoom button 889. If obtaining an input for selecting the smart zoom button 889, the controller 180 may perform a zoom processing so that the selected subject can be displayed in a maximal size. And, the controller 180 may display a zoom-processed image 820 on the display unit 151. In the zoom-processed state, the controller 180 may track the subject and display the moving subject on the display region center of the display unit 151.

Figure 9:
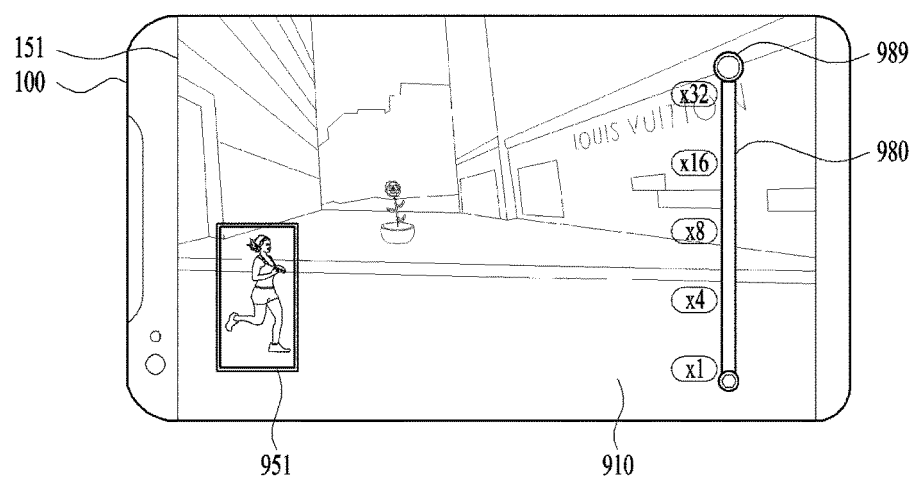
FIG. 9 is a diagram for an example of a discontinuous tracking according to various embodiments of the present invention.

FIG. 9 is a diagram for an example of a discontinuous tracking according to various embodiments of the present invention.

Referring to FIG. 9, the terminal 100 may display a preview image 910 taken through the camera 121 on the display unit 151. The terminal 100 may obtain an input for selecting a subject from the preview image 910 and mark the selected subject 750 with a focus indicator. The controller 180 may display a zoom slide 980 for the selected subject and also display a smart zoom button 989. For one example, if the subject is touched short, the controller 180 can discontinuously track the subject and display a first focus indicator 951. The controller 180 can discontinuously track the selected subject. When the selected subject is enlarged or reduced, the controller 180 can display the selected subject on a display region center of the display unit 151.

Thus, if the selected subject moves, the terminal 100 can track the moving subject and display the selected subject on the center of the display region.

The terminal 100 according to various embodiments of the present invention can display guide information on an optimal magnification. This is described with reference to FIG. 10 and FIG. 11.

Figure 10:
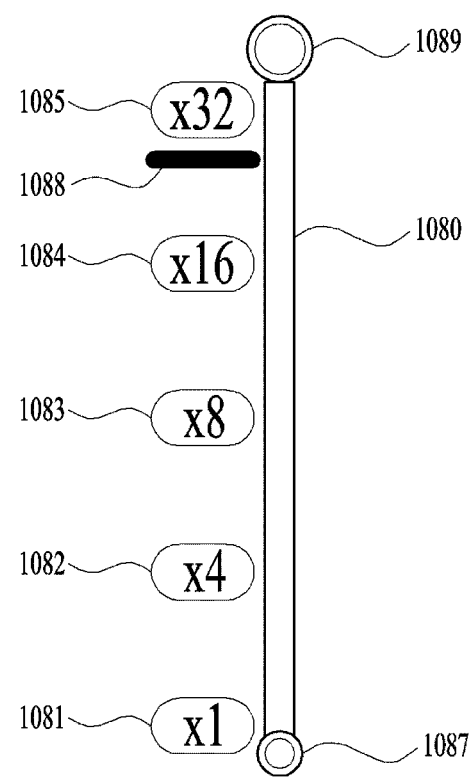
FIG. 10 is a diagram of an optimal magnification displayed zoom slide according to various embodiments of the present invention.

FIG. 10 is a diagram of an optimal magnification displayed zoom slide according to various embodiments of the present invention.

Referring to FIG. 10, the controller 180 may display a zoom slide 1080 for zoom-in/out and also display a slide bar 1087 at a location corresponding to a current magnification. The controller 180 may display zoom magnifications 1081 to 1085 on the zoom slide 1080, and also display the aforementioned smart zoom button 1089. The controller 180 may display an indicator 1088, which indicates an optimal magnification for a selected subject, on the zoom slide 1080. Herein, the optimal magnification may include a magnification corresponding to a smart zoom or a magnification displayed in a maximal size on a display region having a selected subject displayed thereon.

Figure 11:
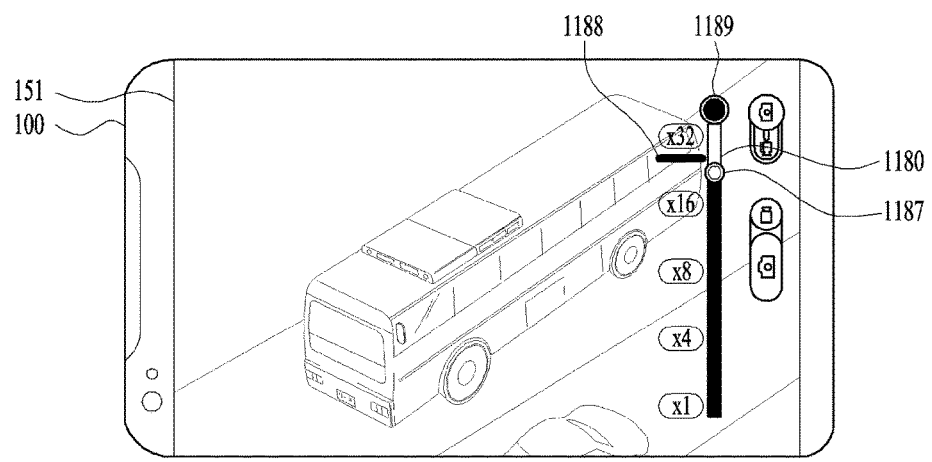
FIG. 11 is a diagram of an image enlarged at an optimal magnification according to various embodiments of the present invention.

FIG. 11 is a diagram of an image enlarged at an optimal magnification according to various embodiments of the present invention.

Referring to FIG. 11, the controller 180 of the terminal 100 may display a preview image taken through the camera 121 on the display unit 151 and also display a zoom slide 1180. The terminal 100 may display an indicator 1188 indicating an optimal magnification on the zoom slide 1180 and also display a smart zoom button 1189. If obtaining an input for moving a slide bar 1187 to a location corresponding to the indicator 1188 indicating the optimal magnification, the controller 180 may perform a zoom processing at the optimal magnification centering on a selected subject. And, the controller 180 may display an image zoom-processed at the optimal magnification on the display unit 151.

FIG. 3 is referred to again.

The terminal 100 may display a mini map at an original magnification [S360].

When displaying a zoom-in or zoom-out image, the controller 180 may display an image at an original magnification as a minim-map on a prescribed region of the display unit 151. Herein, the image at the original magnification may mean a preview image before a zoom processing or an original preview image. In response to an input to the displayed mini map, the controller 180 may switch an image displayed on the display unit 151. This is described with reference to FIG. 12 and FIG. 13.

Figure 12:
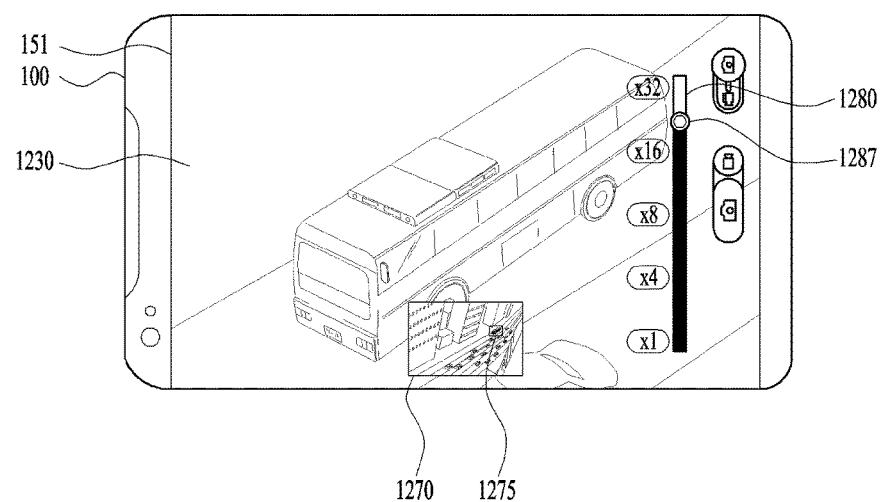
FIG. 12 is a diagram for an example of a mini map display according to various embodiments of the present invention.

FIG. 12 is a diagram for an example of a mini map display according to various embodiments of the present invention.

Referring to FIG. 12, the controller 180 may display an enlarged image 1230 for a selected subject and also display a zoom slide 1280 on a prescribed region. On the zoom slide 1280, the controller 180 may display a slide bar 1287 at a point corresponding to a magnification of the currently displayed image 1230. The controller 180 may display a mini map 1270 at an original magnification on a prescribed region of the display unit 151. Herein, the original magnification may mean a magnification of a preview image failing to zoom in or out. On the displayed mini map 1270, the controller 180 may display a current region indicator 1275 indicating a region corresponding to the enlarged image 1230 currently displayed. Hence, a user can easily recognize whether a prescribed region is enlarged in the preview image before enlargement.

Figure 13:
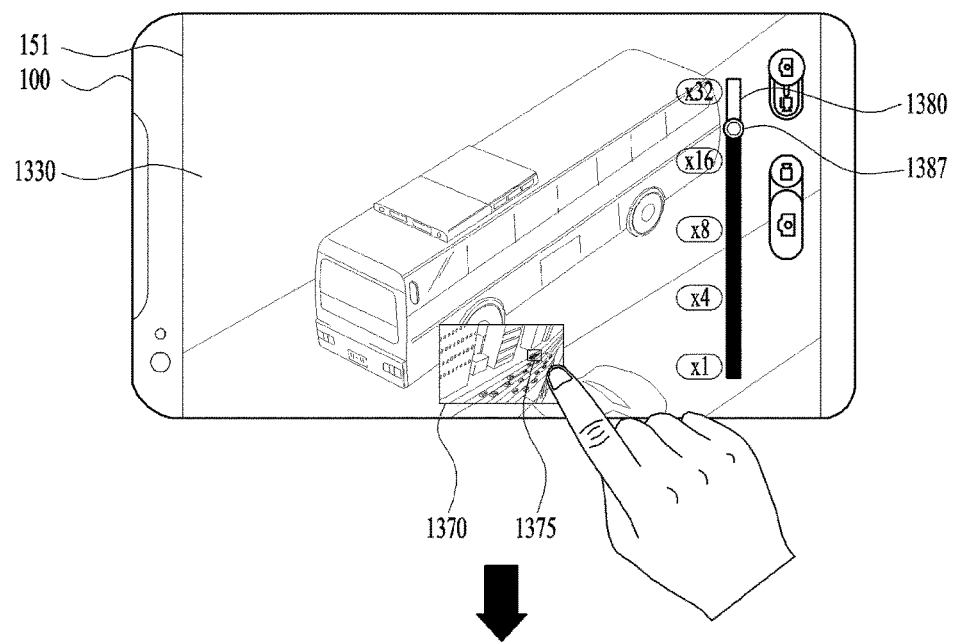
FIG. 13 is a diagram for an example of screen switching according to various embodiments of the present invention.
Figure 13:
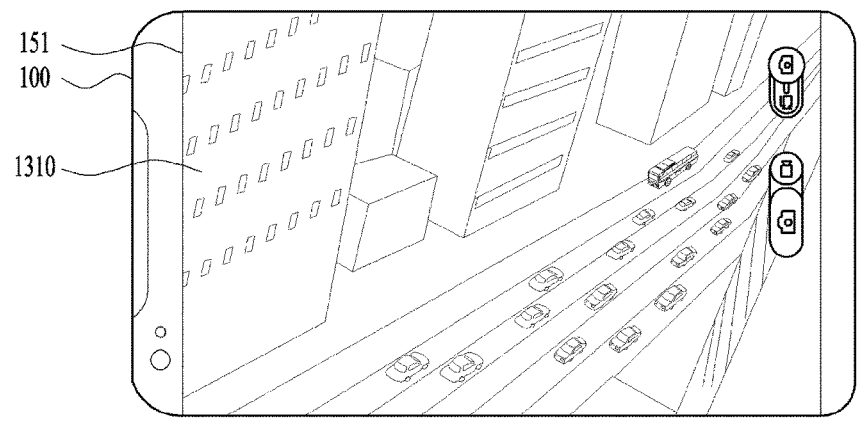

FIG. 13 is a diagram for an example of screen switching according to various embodiments of the present invention.

Referring to FIG. 13, the controller 180 may display an enlarged image 1330 for a selected subject and also display a zoom slide 1380 on a prescribed region. On the zoom slide 1380, the controller 180 may display a slide bar 1387 at a point corresponding to a magnification of the currently displayed image 1330. The controller 180 may display a mini map 1370 at an original magnification on a prescribed region of the display unit 151. If obtaining an input of long touching the mini map 1370 or an input of force-touching the mini map 1370, the controller 180 may display an image 1310 at an original magnification on the display unit 151. Herein, the original magnification may mean a magnification of a preview image failing to zoom in or out. Hence, the terminal may switch to display the image 1310 at the original magnification from the enlarged image 1330. In response to an input to the image 1310 at the original magnification, the controller 180 may display an enlarged image on the display unit 151.

FIG. 3 is referred to again.

Referring to FIG. 3, the terminal 100 may obtain a shot input to the zoom-in/out image [S370] and then capture an image in response to the obtained input [S380].

The controller 180 may obtain a shot input to the zoom-in or zoom-out image centering on the selected subject and then capture the zoom-in or zoom-out image in response to the shot input. In response to the shot input, the controller 180 may capture both of the zoom-in or zoom-out image and an image corresponding to the mini map simultaneously. Hence, the terminal 100 may capture the image at the original magnification as well as the image displayed in the preview image. This is described in detail with reference to FIG. 14 and FIG. 15.

Figure 14:
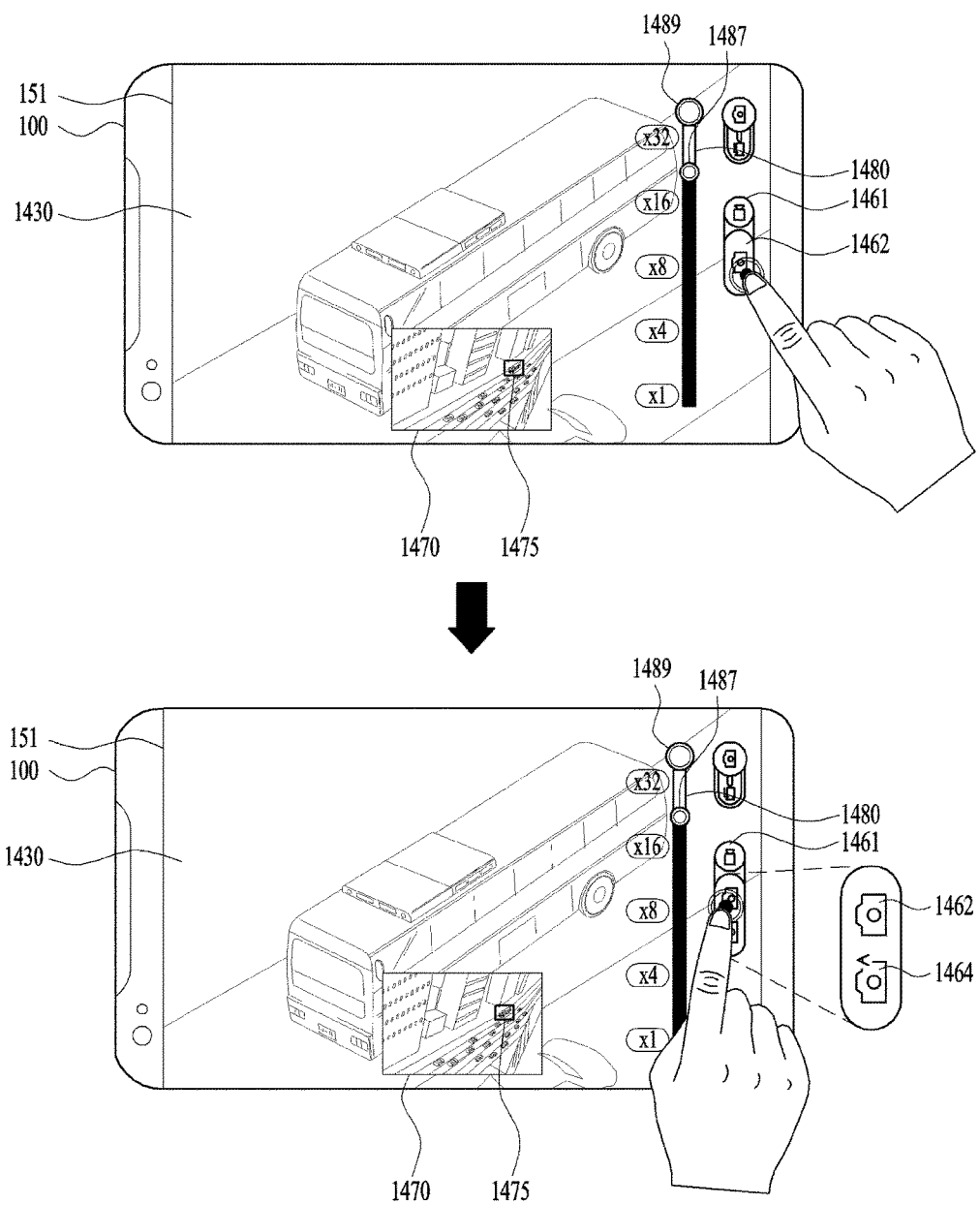
FIG. 14 and FIG. 15 are diagrams for examples of a shot operation according to various embodiments of the present invention.
Figure 15:
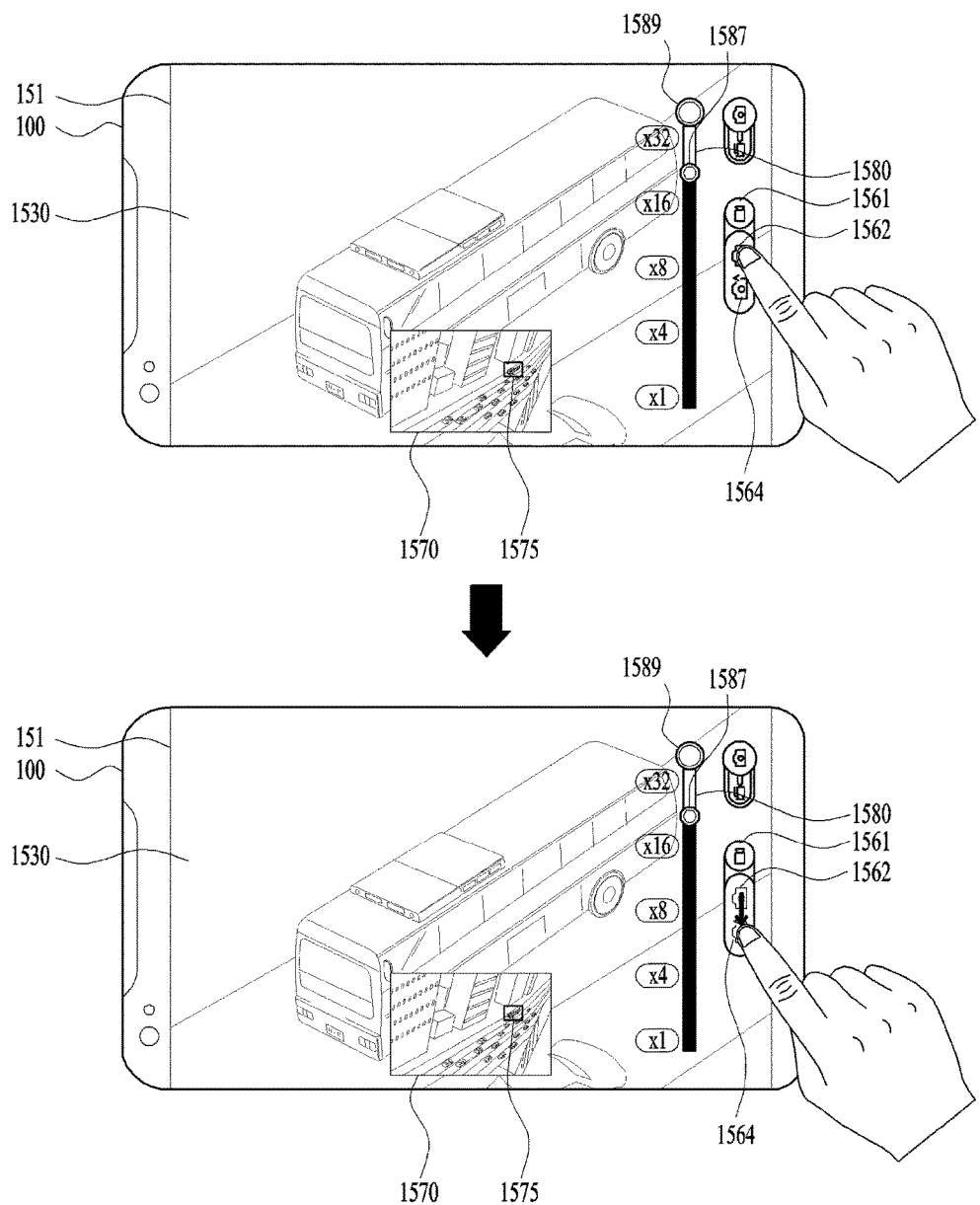

FIG. 14 and FIG. 15 are diagrams for examples of a shot operation according to various embodiments of the present invention.

Referring to FIG. 14, the controller 180 of the terminal 100 may display an enlarged image 1430 for a selected subject and a mini map 1470 at an original magnification on the display unit 151. And, the controller 180 may display a zoom slide 1480 including a smart zoom button 1489 on a prescribed region of the display unit 151. The controller 180 may display a video shot button 1461 and an image shot button 1462, which are related to shots, and then obtain an input of pressing the displayed image shot button 1462. If the controller 180 obtains the input of pressing the image shot button 1462 and the input of pressing the image shot button 1462 is then maintained, the controller 180 may display the image shot button 1462 for taking an image corresponding to the enlarged image 1430 only and a full image shot button 1464 for taking both an image corresponding to the enlarged image 1430 and an image corresponding to a mini map. If obtaining an input of touching the image shot button 1462, the controller 180 can capture an image corresponding to the enlarged image 1430. Herein, the input of touching the image shot button 1462 may include an input applied in a manner that a touch according to an input of pressing the image shot button 1462 is detached from the display unit 151.

Referring to FIG. 15, the controller 180 of the terminal 100 may display an enlarged image 1530 for a selected subject and a mini map 1570 at an original magnification on the display unit 151. And, the controller 180 may display a zoom slide 1580 including a smart zoom button 1589 on a prescribed region of the display unit 151. The controller 180 may display a video shot button 1561 and an image shot button 1562, which are related to shots, and then obtain an input of pressing the displayed image shot button 1562. If the controller 180 obtains the input of pressing the image shot button 1562 and the input of pressing the image shot button 1562 is then maintained, the controller 180 may display the image shot button 1562 for taking an image corresponding to the enlarged image 1530 only and a full image shot button 1564 for taking both an image corresponding to the enlarged image 1530 and an image corresponding to a mini map. If obtaining an input of touching the full image shot button 1564, the controller 180 can capture a plurality of images respectively corresponding to the enlarged image 1530 and the mini map 1570. Herein, the input of touching the full image shot button 1564 may include an input applied in a manner that a touch according to an input of pressing the image shot button 1562 is moved to the full image shot button 154 and then detached from the display unit 151.

Thus, in response to an input to a shot button, the terminal 100 may take one or more videos or one or more images.

The terminal 100 according to various embodiments of the present invention may enable a plurality of regions to zoom in or out and also eliminate the regions.

Figure 16:
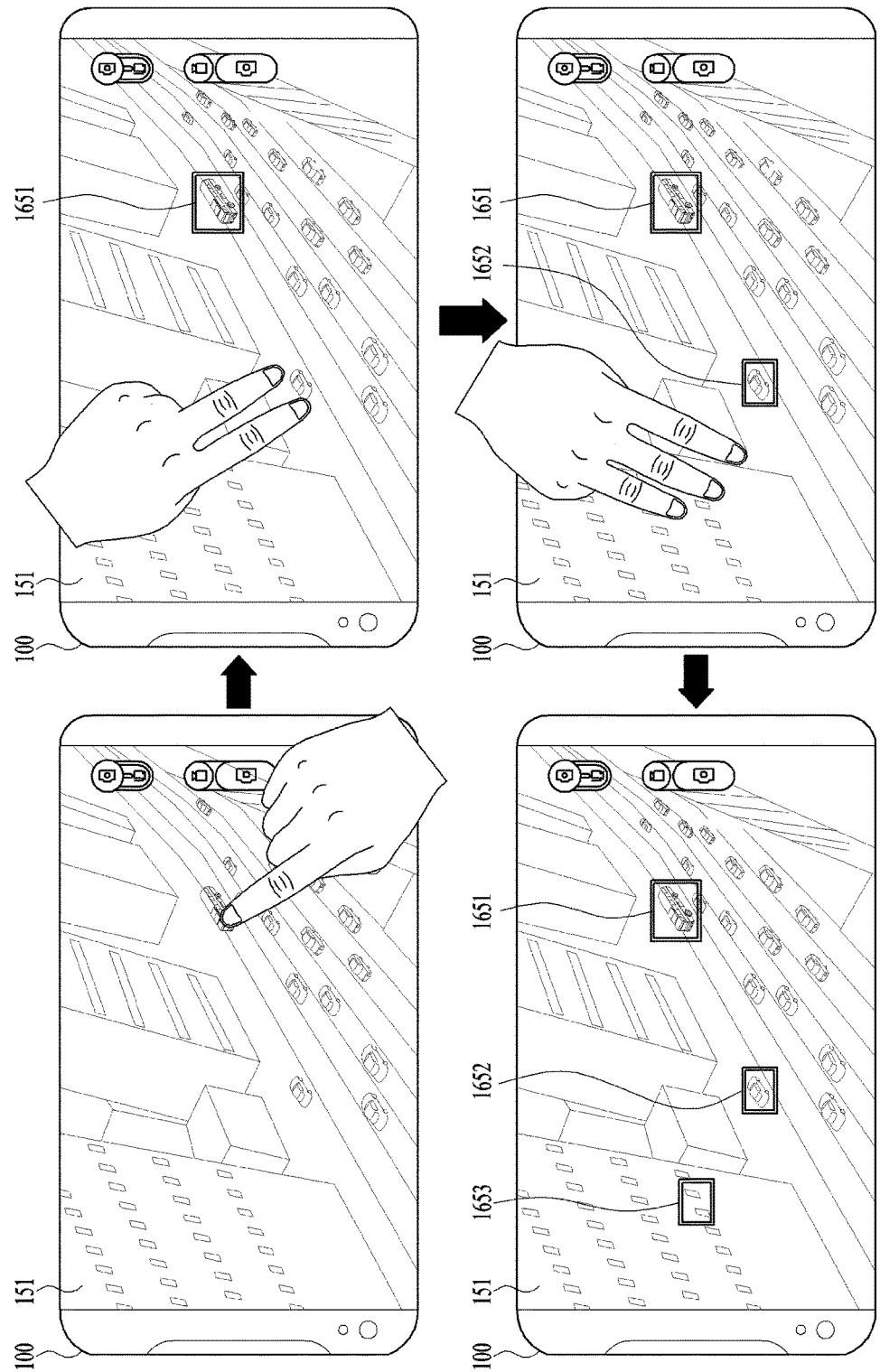
FIG. 16 is a diagram for an example of creating a plurality of zoom regions according to various embodiments of the present invention.

FIG. 16 is a diagram for an example of creating a plurality of zoom regions according to various embodiments of the present invention.

Referring to FIG. 16, the controller 180 may obtain an input (e.g., single finger touch input) for selecting a prescribed point as a first zoom region from a preview image displayed on the display unit 151. Herein, the zoom region may mean a zoom-in or zoom-out processed region or a region that can be captured as a single region. The controller 180 may mark a first zoom region 1651 selected first with a focus indicator. Subsequently, the controller 180 may obtain an input (e.g., double finger touch input) for selecting a prescribed point as a second zoom region from the preview image displayed on the display unit 151. The controller 180 may mark a second zoom region 1652 selected second with a focus indicator. Finally, the controller 180 may obtain an input (e.g., triple finger touch input) for selecting a prescribed point as a third zoom region from the preview image displayed on the display unit 151. The controller 180 may mark a third zoom region 1653 selected second with a focus indicator.

Figure 17:
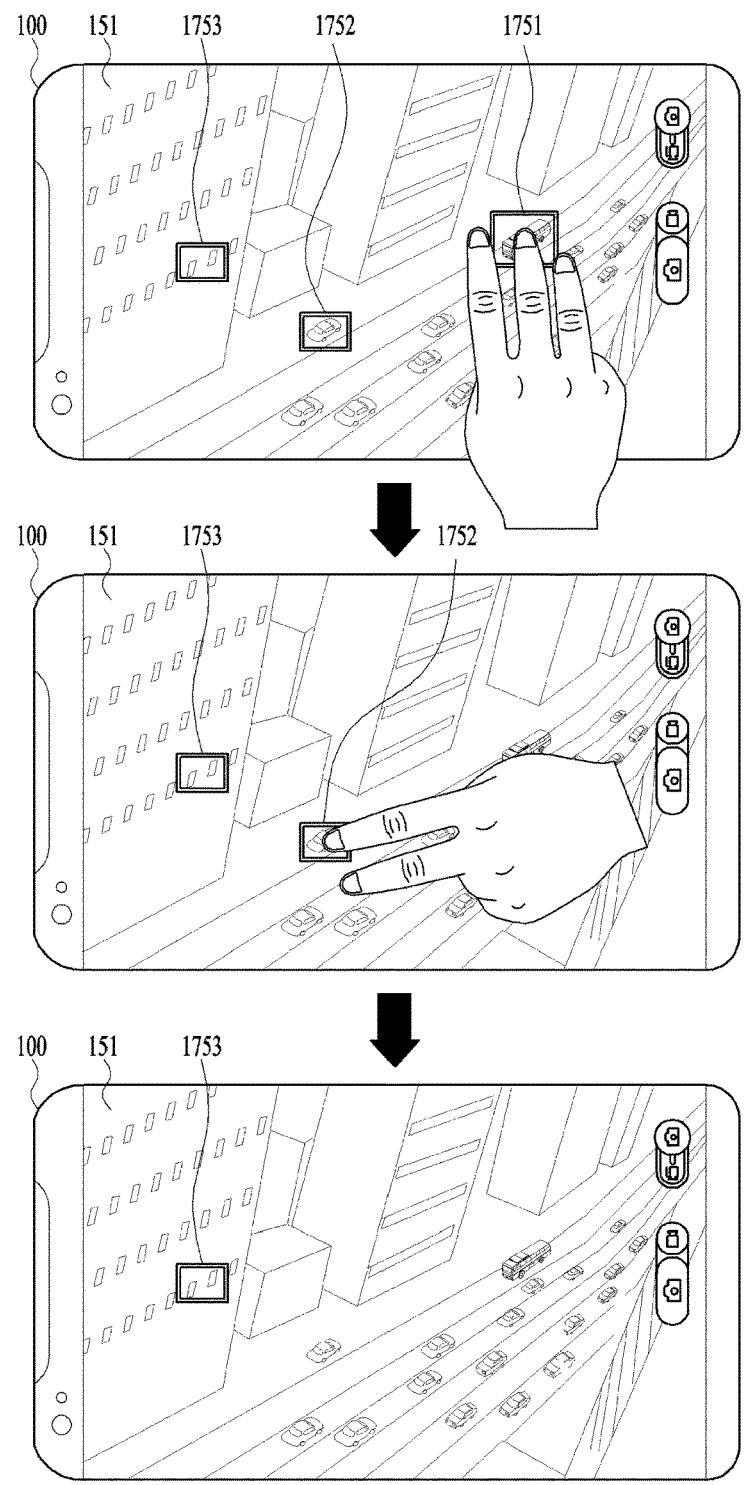
FIG. 17 is a diagram for an example of deleting a plurality of zoom regions according to various embodiments of the present invention.

FIG. 17 is a diagram for an example of deleting a plurality of zoom regions according to various embodiments of the present invention.

Referring to FIG. 17, the controller 180 may display a preview image on the display unit 151, and mark first to third zoom regions 1751 to 1753 with focus indicators, respectively. The controller 180 may obtain an input (e.g., triple finger touch input) for deleting the first zoom region 1751. In response to the obtained triple finger touch input, the controller 180 can delete the first zoom region 1751. The controller 180 may obtain an input (e.g., double finger touch input) for deleting the second zoom region 1752. In response to the obtained double finger touch input, the controller 180 can delete the second zoom region 1752. The controller 180 may obtain an input (e.g., single finger touch input) for deleting the third zoom region 1753. In response to the obtained single finger touch input, the controller 180 can delete the third zoom region 1753.

Thus, the terminal can create a plurality of zoom regions in response to an input and then delete each of a plurality of the created zoom regions.

The terminal 100 according to various embodiments of the present invention can simultaneously capture images of a plurality of zoom regions.

Figure 18:
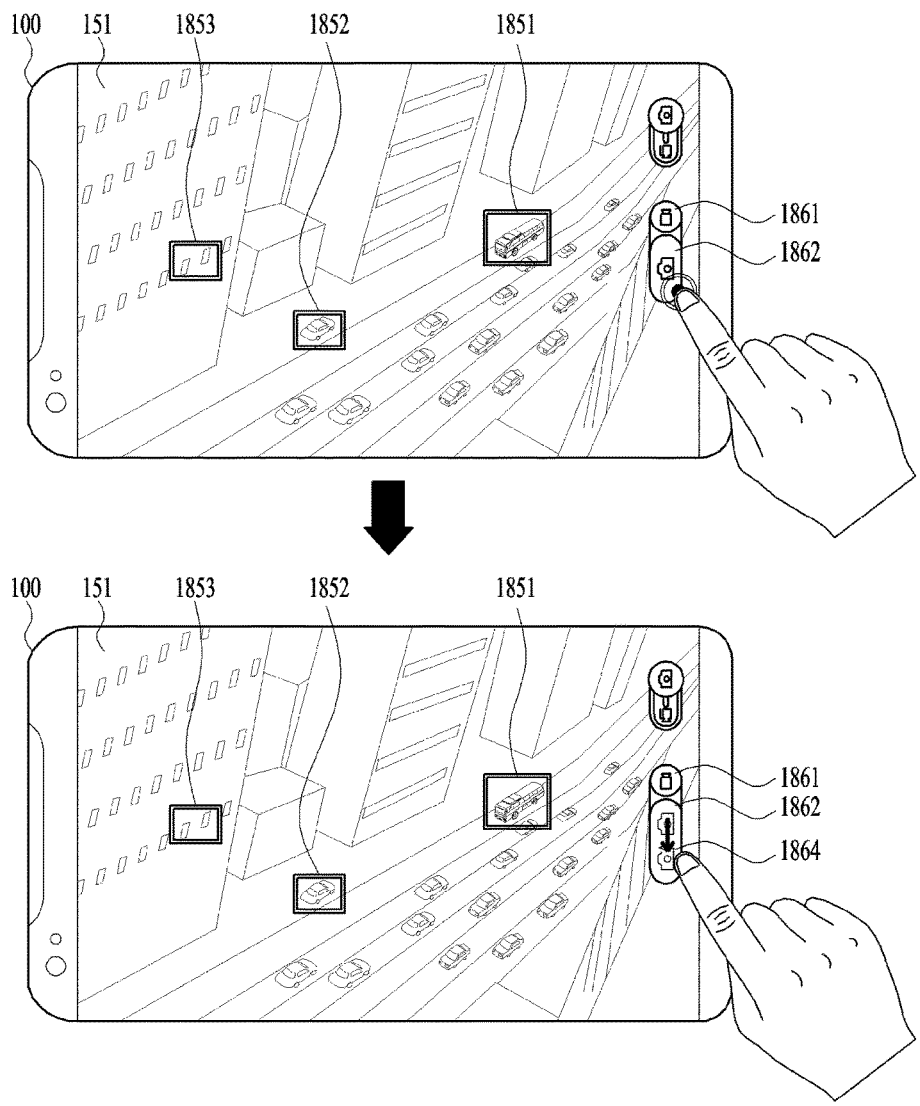
FIG. 18 is a diagram for an example of capturing a plurality of zoom regions according to various embodiments of the present invention.

FIG. 18 is a diagram for an example of capturing a plurality of zoom regions according to various embodiments of the present invention.

Referring to FIG. 18, the controller 180 may display a preview image on the display unit 151, and mark first to third zoom regions 1851 to 1853 with focus indicators, respectively. The controller 180 may display a video shot button 1861 and an image shot button 1862, which are related to shots, and then obtain an input of pressing the displayed image shot button 1862. If the controller 180 obtains the input of pressing the image shot button 1862 and the input of pressing the image shot button 1862 is then maintained, the controller 180 may display the image shot button 1862 for taking an image corresponding to a preview image only and a full image shot button 1864 for taking all images respectively corresponding to the preview image and a plurality of the zoom regions 1851 to 1853. If obtaining an input of touching the full image shot button 1864, the controller 180 can capture a plurality of images respectively corresponding to the preview image and a plurality of the zoom regions 1851 to 1853. Herein, the input of touching the full image shot button 1864 may include an input applied in a manner that a touch according to an input of pressing the image shot button 1862 is moved to the full image shot button 1864 and then detached from the display unit 151.

Thus, in response to an input to a shot button, the terminal 100 can simultaneously capture images respectively corresponding to a preview image and a plurality of zoom regions.

The terminal 100 according to various embodiments of the present invention can record a video or capture an image according to various conditions. For instance, according to at least one of a location condition, a moving condition and a size condition of a selected subject, the terminal 100 can record a video or capture an image. This is described with reference to FIGS. 19 to 21.

Figure 19:
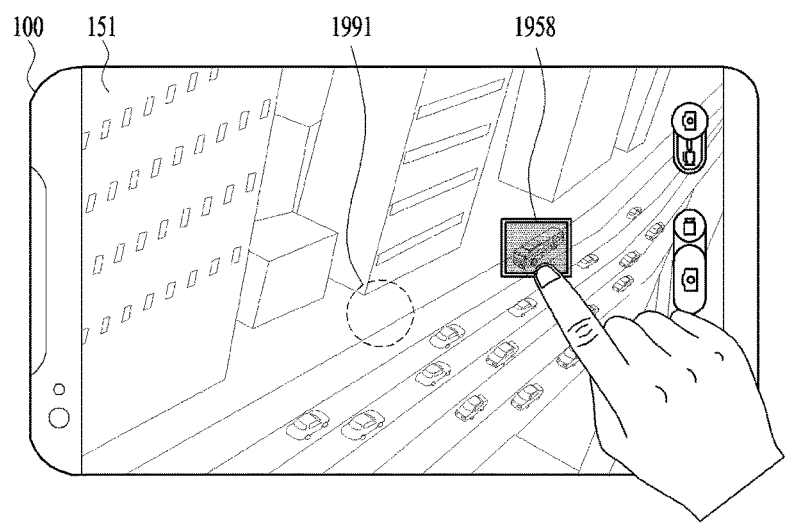
FIG. 19 is a diagram for an example of a shot under a location condition according to various embodiments of the present invention.

FIG. 19 is a diagram for an example of a shot under a location condition according to various embodiments of the present invention.

Referring to FIG. 19, the controller 180 may display a preview image on the display unit 151 and then obtain an input for selecting a subject 1958. The controller 180 may obtain an input of a long touch or a force touch to the subject 1958 and then recognize a shot condition that a shot is enabled if the subject 1958 selected according to the obtained input is located at a specific location on the preview image, e.g., a center 1991 of the preview image. Hence, if the subject 1958 arrives at the center of the preview image, the controller 180 can record a video or capture an image.

Figure 20:
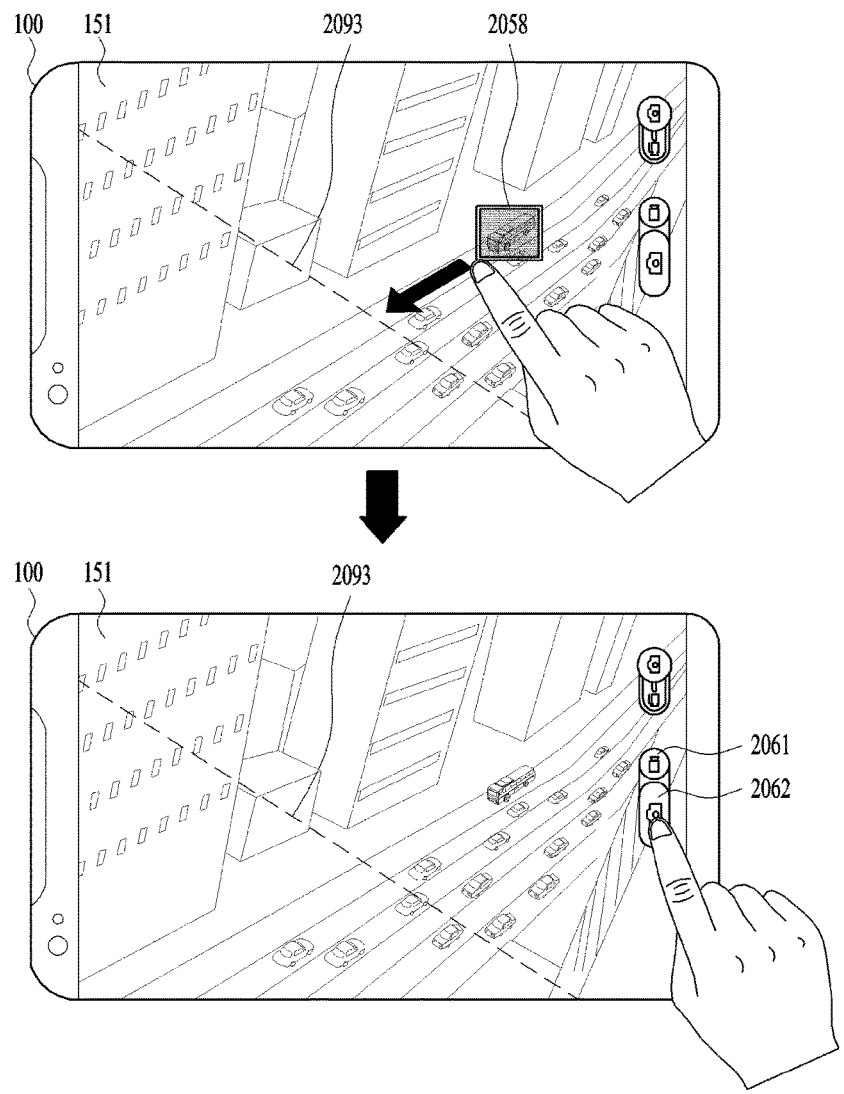
FIG. 20 is a diagram for an example of a shot under a location arrival condition according to various embodiments of the present invention.

FIG. 20 is a diagram for an example of a shot under a location arrival condition according to various embodiments of the present invention.

Referring to FIG. 20, the controller 180 may display a preview image on the display unit 151 and then obtain an input of dragging a subject 2058 to a predetermined location, e.g., a shot location 2093 to enable a shot. In response to an input of dragging the subject 2058, the controller 180 may display a guide line indicating the shot location 2093. In response to the obtained input, the controller 180 may recognize a shot condition that an image is taken if the subject 2058 arrives at the shot location 2093. Hence, if the subject 2058 arrives at the shot location 2093, the controller 180 can record a video or capture an image.

Figure 21:
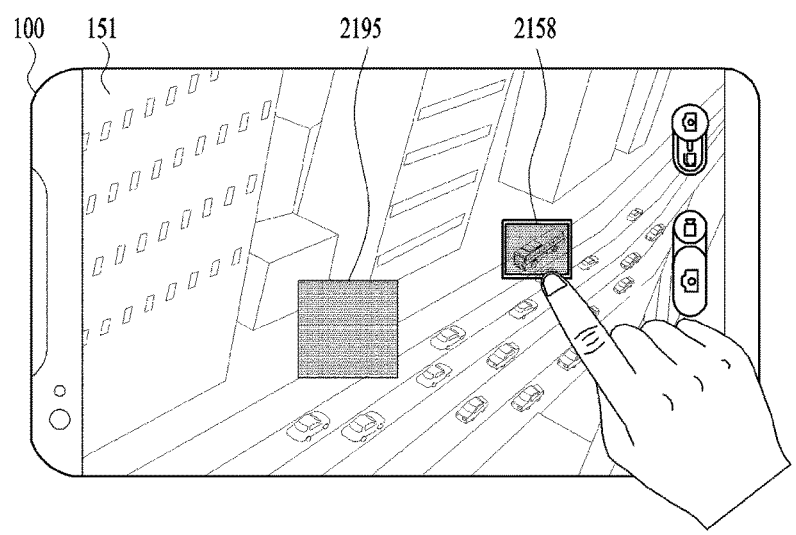
FIG. 21 is a diagram for an example of an image shot under a size condition according to various embodiments of the present invention.

FIG. 21 is a diagram for an example of an image shot under a size condition according to various embodiments of the present invention.

Referring to FIG. 21, the controller 180 may display a preview image on the display unit 151 and then obtain an input for selecting a subject 2158. The controller 180 may obtain an input of a long touch or a force touch to the subject 2158 and then recognize a shot condition that a shot is enabled if the subject 2158 selected according to the obtained input is displayed in a reference size 2185. For instance, the controller 180 can change a size of the reference size 2195 in response to a touch time or force of touching the subject 2158. For another instance, in proportion to an increasing force of a touch to the subject 2158, the controller 180 can increase the size of the reference size 2195. If the subject 2158 reaches a size equal or similar to the reference size 2195, the controller 180 can record a video or capture an image.

Thus, the terminal 100 can record a video or capture an image according to at least one of a location condition, a moving condition and a size condition of a selected subject.

The terminal 100 according to various embodiments of the present invention may display a plurality of preview images and then capture an image according to selections of a plurality of the displayed preview images.

Figure 22:
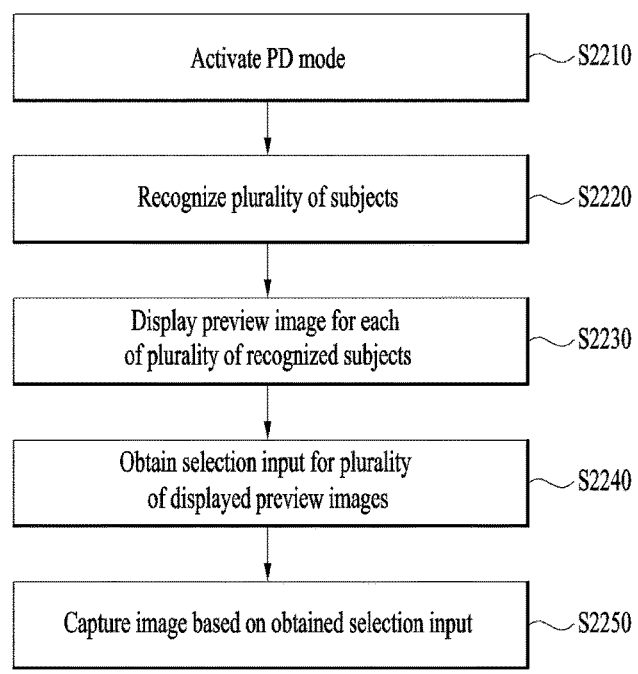
FIG. 22 is a flowchart for an operating method of a terminal according to various embodiments of the present invention.

FIG. 22 is a flowchart for an operating method of a terminal according to various embodiments of the present invention.

Referring to FIG. 22, the terminal 100 may activate a PD (producer, product director) mode [S2210] and recognize a plurality of subjects contained in a preview image [S2220].

The controller 180 may display a plurality of preview images and activate a PD mode for capturing a preview image selected from a plurality of the preview images. For instance, if obtaining an input for selecting a PD mode from a menu, the controller 180 may activate the PD mode. For another instance, if receiving an input of a preset gesture to the displayed preview image, the controller 180 may activate the PD mode.

In the activated PD mode, the controller 180 may recognize a plurality of subjects contained in the displayed preview image. Herein, the recognized subject may include a character, a thing, or a background corresponding to a place.

The terminal 100 may display a preview image for each of a plurality of the recognized subjects [S2230].

The controller 180 may display a preview image for each of a plurality of the subjects in the preview image on the display unit 151. For instance, the controller 180 can simultaneously display a preview image for each of a plurality of the subjects recognized from the preview image and a full preview image on the display unit 151.

The terminal 100 may display a plurality of the preview images on partitioned screens, respectively. And, the terminal 100 may display a plurality of the preview images in different sizes, respectively.

The terminal 100 may obtain a selection input for a plurality of the displayed preview images [S2240], and capture an image based on the obtained selection input [S2250].

The controller 180 may obtain an input for selecting at least one preview image from a plurality of the displayed preview images and then capture the selected preview image. Each time an input for selecting a preview image is obtained, the controller 180 may switch to enable the selected preview image to be captured.

Detailed embodiments are described with reference to FIGS. 23 to 27.

Figure 23:
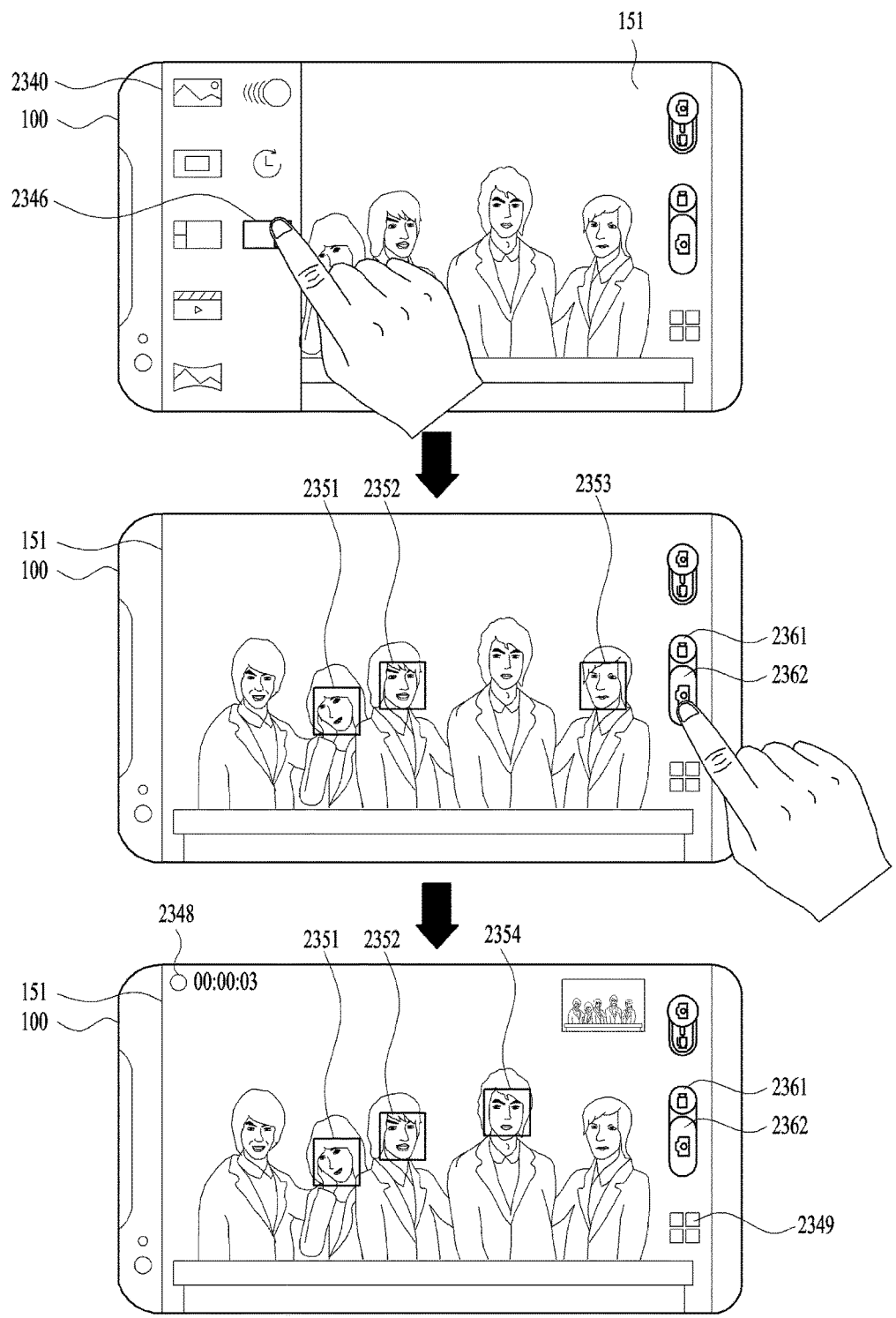
FIG. 23 is a diagram for an example of a PD mode activation and a subject recognition according to various embodiments of the present invention.

FIG. 23 is a diagram for an example of a PD mode activation and a subject recognition according to various embodiments of the present invention.

Referring to FIG. 23, the controller 180 may display a preview image on the display unit 151 and also display a video menu 2340. The controller 180 may obtain an input for selecting a PD mode 2346 from the displayed video menu 2340. If the PD mode 2346 is selected, the controller 180 may activate the PD mode. In the activated PD mode, the controller 180 may recognize a plurality of subjects contained in the displayed preview image. And, the controller 180 may mark each of the recognized subjects with a focus indicator. For instance, the controller 180 may recognize first to third characters 2351 to 2353 and then marks each of the recognized characters with a focus indicator. The controller 180 may display a video shot button 2361 and an image shot button 2362 and then obtain an input for selecting at least one of the shot buttons. If the shot button is selected, the controller 180 may record or capture a video. In this case, the video shot may include saving or recording a preview image. When a shot is taken, the controller 180 may display an indicator 2348 indicating that the shot is in progress and also display a recorded video as a mini map 2370. And, the controller 180 may take a shot of (e.g., save, record, etc.) a selected subject or a selected preview image. Moreover, the controller 180 may display a partition mode button 2349 for displaying a plurality of the preview images on a partitioned screen.

Figure 24:
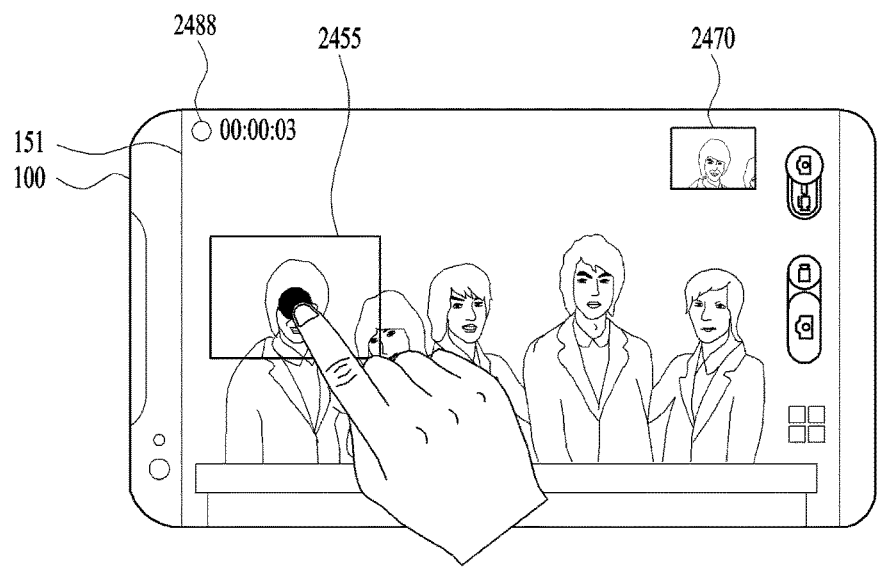
FIG. 24 is a diagram for an example of a shot in PD mode according to various embodiments of the present invention.
Figure 24:
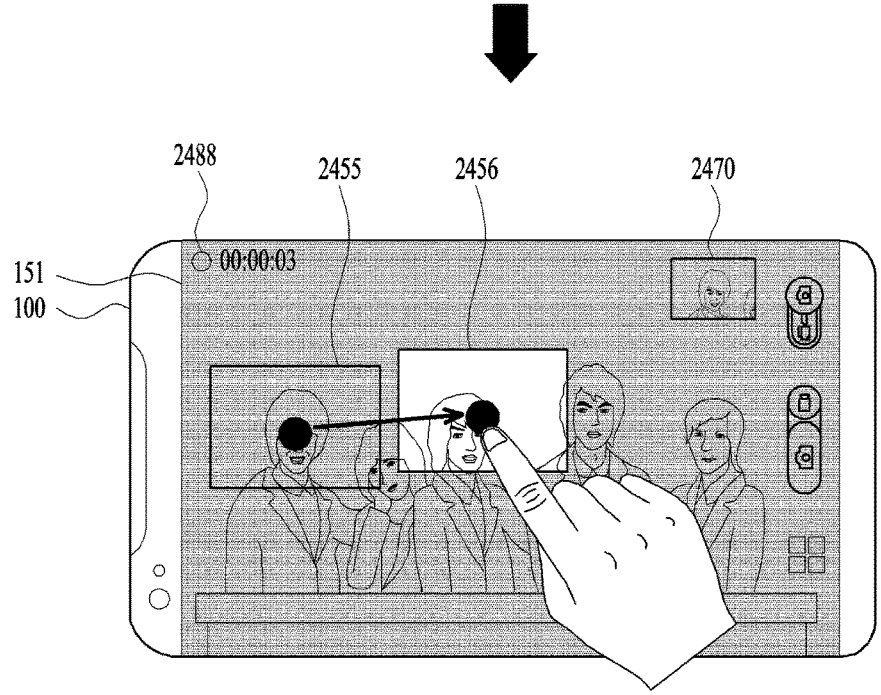

FIG. 24 is a diagram for an example of a shot in PD mode according to various embodiments of the present invention.

Referring to FIG. 24, in PD mode, the controller 180 may capture a partial region in a full preview image. For instance, the controller 180 obtains an input for selecting a partial region 2455 from a full preview image and then captures the selected region 2455 only. While a shot is taken, the controller 180 may display an indicator 2448 indicating that the shot is in progress, and also display a captured image as a mini map 2470 on a prescribed region of the display unit 151. The controller 180 may obtain an input of switching the currently captured partial region 2455 to a different region 2456. For instance, the controller 180 may obtain an input of dragging the currently captured partial region 2455 to the different region 2456 to capture. The controller 180 may capture the dragged & dropped region 2456 and display the captured image as the mini map 2470. Thus, the terminal 100 can capture a partial region of a full preview image only and may move the captured partial region in response to an input to the captured region. Thus, a user can capture a partial region of a preview image only. Therefore, the user can be provided with an effect of using multiple cameras using the terminal 100.

Figure 25:
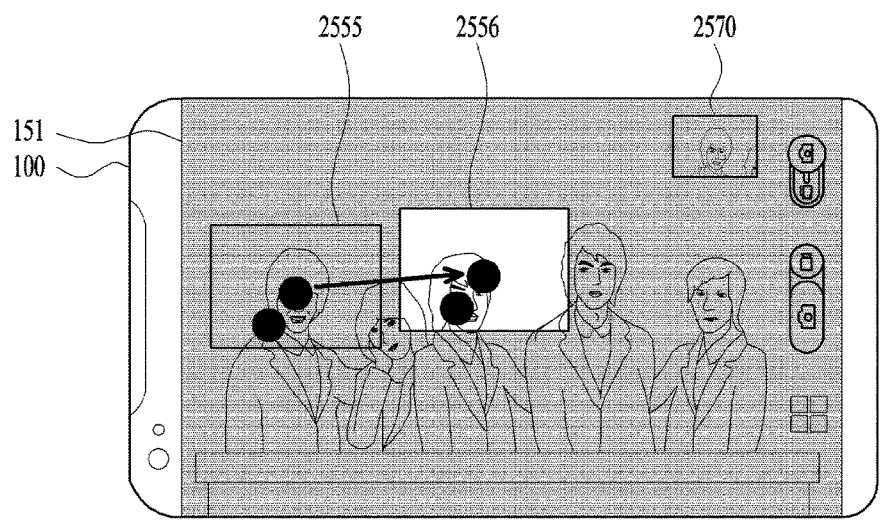
FIG. 25 is a diagram for an example of a transition effect according to various embodiments of the present invention.

FIG. 25 is a diagram for an example of a transition effect according to various embodiments of the present invention.

Referring to FIG. 25, the terminal 100 may capture a partial region 2555 of a preview image only and obtain an input for moving a capture region from a first region 2555 to a second region 2556. If the input for moving the captured region from the first region 2555 to the second region 2556 is an input of a drag with two fingers, the terminal 100 can apply a panning effect on switching the first region 2555 to the second region 2556. Hence, the panning effect can be applied to the image switched from the first region 2555 to the second region 2556.

Figure 26:
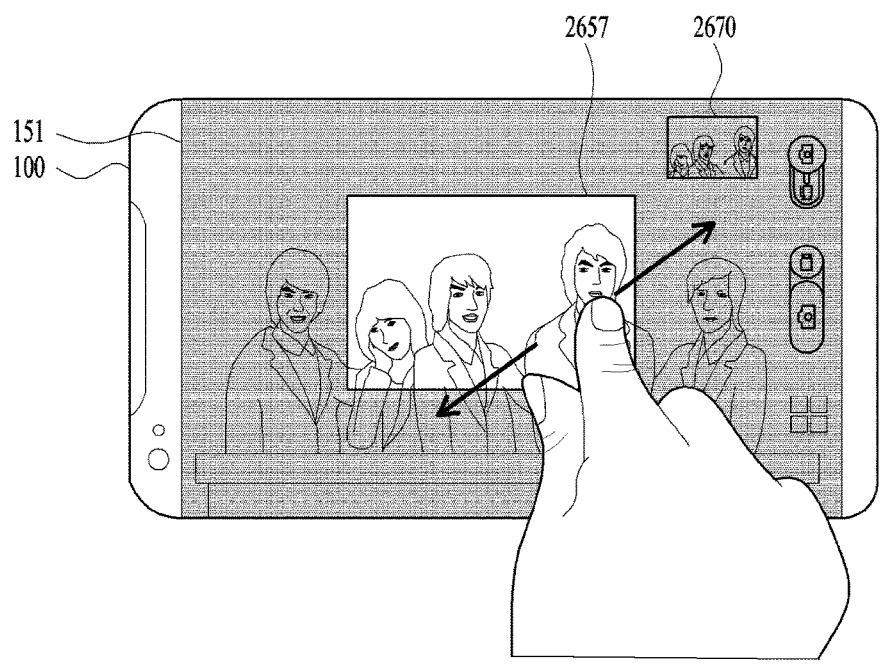
FIG. 26 is a diagram for an example of an image size adjustment according to various embodiments of the present invention.

FIG. 26 is a diagram for an example of an image size adjustment according to various embodiments of the present invention.

Referring to FIG. 26, the terminal 100 may capture a partial region 2657 of a preview image only and display a captured image as a mini map 2670. The terminal 100 may obtain an input for adjusting the captured partial region 2657 and then capture the adjusted region. For one example, the controller 180 may obtain an input of pinching out the partial region 2657 and is then able to increase a size of the captured partial region 2657 in response to the obtained pinch-out input. Thus, the terminal 100 can adjust a size of a captured region captured in a preview image and then capture the adjusted region.

Figure 27:
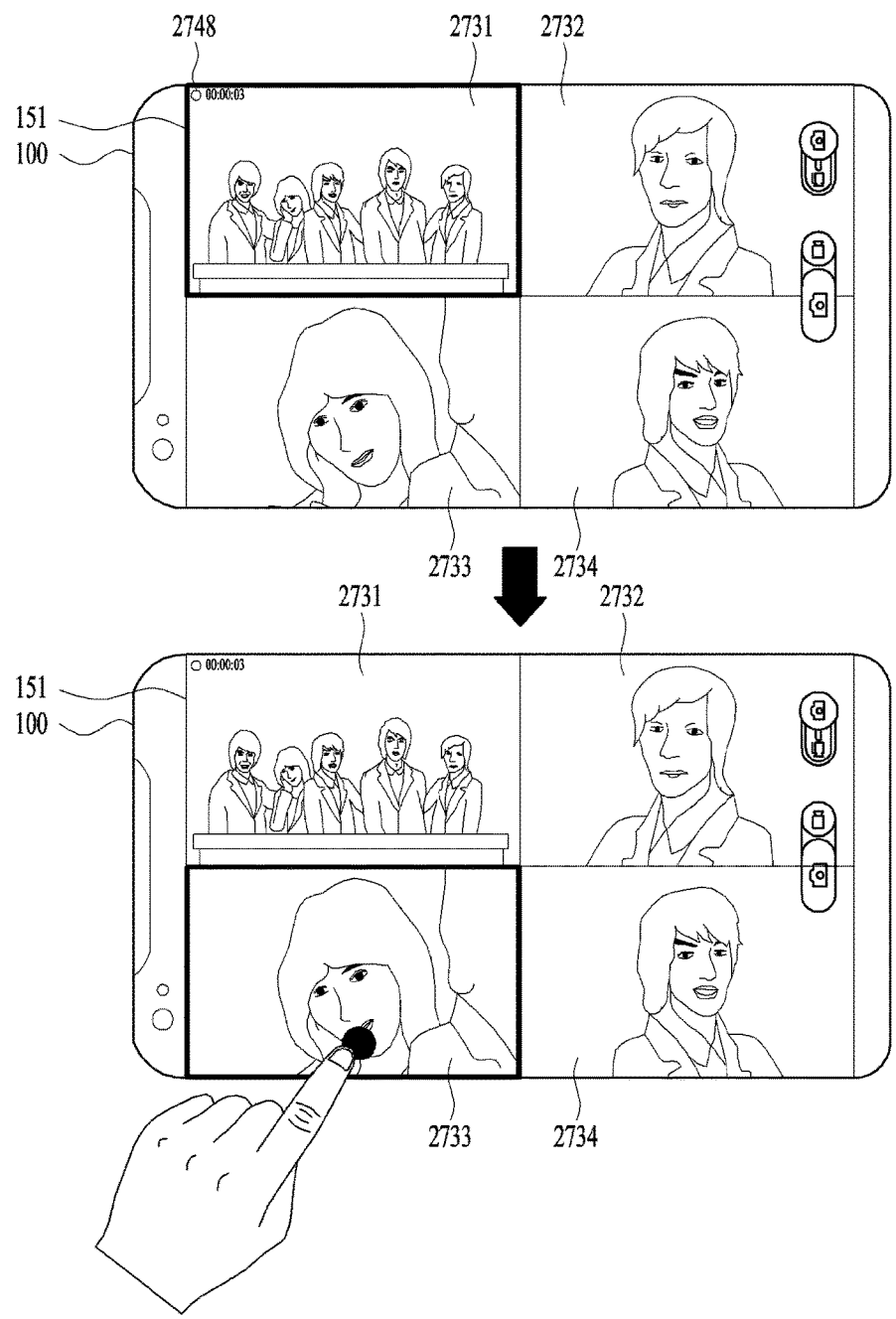
FIG. 27 is a diagram to illustrate a shot in a partitioned screen according to various embodiments of the present invention.

FIG. 27 is a diagram to illustrate a shot in a partitioned screen according to various embodiments of the present invention.

Referring to FIG. 27, the terminal 100 may display a plurality of preview images on the display unit 151. For instance, if obtaining an input for selecting the aforementioned partition mode button, the controller 180 may display a plurality of the preview images on the display unit 151. As a plurality of the preview images, the controller 180 may display a full preview image 2731, a first preview image 2732 for a recognized first character, a second preview image 2733 for a recognized second character, and a third preview image 2734 for a recognized third character. If a character recognized from each of the first to third preview images 2732 to 2734 moves, the controller 180 may track the movement of the corresponding character and then display a tracked image as a preview image. While a shot is taken, the controller 180 may display an indicator 2748 indicating that the shot is in progress and also control a frame of a taken preview image to be displayed in a manner of being distinguished from a fame of a different image. For instance, the controller 180 may display a frame of the taken preview image in red. And, the controller 180 may capture an image selected from a plurality of the preview images only. For instance, if the full preview image 2731 is selected, the controller 180 may capture the selected full preview image 2731 only. If the second preview image 2733 is selected, the controller 180 may capture the selected second preview image 2733 only. Accordingly, the captured image can be switched from the full preview image 2731 to the second preview image 2733. Therefore, a user can switch a captured image by selecting a desired preview image only.

Meanwhile, if obtaining an input for selecting a plurality of the preview images, the controller 180 can simultaneously capture a plurality of the selected preview images. Hence, the controller 180 can capture an image of each of a plurality of the preview images and may capture an image in which a plurality of the preview images are displayed on a single screen.

Thus, the terminal 100 can display a preview image of displaying a partial region of a single preview image only and capture a preview image selected from a plurality of the displayed preview images only. Hence, a user can be provided with an effect as if taking shots using a plurality of cameras simultaneously.

Figure 28:
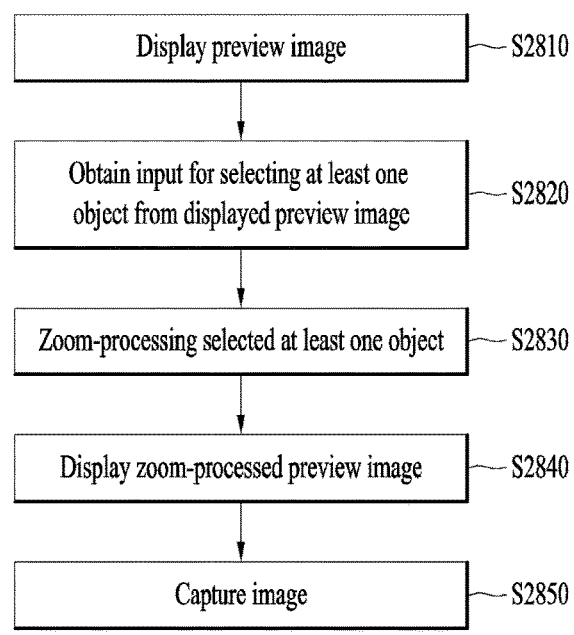
FIG. 28 is a flowchart for an operating method of a terminal according to various embodiments of the present invention.

FIG. 28 is a flowchart for an operating method of a terminal according to various embodiments of the present invention.

Referring to FIG. 28, the terminal 100 may display a preview image [S2810].

The controller 180 of the terminal 100 may display a preview image taken through the camera 121 on the display unit 151. The controller 180 may display a single preview image for a plurality of images taken in a prescribed direction through a plurality of cameras 121b-1 and 121b-2 on the display unit 151.

The terminal 100 may obtain an input for selecting at least one object from the displayed preview image [S2820].

The controller 180 may obtain an input for selecting at least one object, which is to be zoom-processed, from the preview image displayed on the display unit 151.

The controller 180 may receive various inputs as an input for selecting at least one object from the displayed preview image. For instance, the controller 180 may obtain an input of short touching a prescribed point or region of the preview image displayed on the display unit 151 or an input of long touching a prescribed point or region as an input for selecting an object. For another instance, the controller 180 may obtain an input of applying a force touch to a prescribed point or region of the preview image displayed on the display unit 151 as an input for selecting an object. Herein, 'force touch' may mean an input of applying a touch over a predetermined force.

Meanwhile, if obtaining an input of long pressing a preview image, the controller 180 may automatically select at least one zoom-processable object that can be zoom-processed. Thus, an operation for automatically selecting at least one zoom-processable object can be called an object selection recommendation.

Herein, the selected object may include a single recognizable object or a prescribed point. And, the controller 180 may display a focus on the selected object. In response to a type of a selection input for selecting an object, the controller 180 may display a different focus indicator.

Meanwhile, the aforementioned operation of selecting at least one object from the preview image may be represented as locking an object. And, the selected object may be represented as a locked object in the following description.

The terminal 100 may zoom-process the selected at least one object [S2830].

For instance, the controller 180 of the terminal 100 may perform a zoom processing for enlarging or reducing only the selected at least one object in the preview image captured through the camera 121. Hence, the controller 180 may display the preview image having the selected at least one object enlarged or reduced only on the display unit 151.

The controller 180 may perform the zoom processing in response to an input to the selected at least one object in the preview image. For instance, if obtaining an input for enlarging the selected at least one object, the controller 180 may enlarge the selected at least one object only and display a preview image, in which the selected at least one object is enlarged only, on the display unit 151. For another instance, if obtaining an input for reducing the selected at least one object, the controller 180 may reduce the selected at least one object only and display a preview image, in which the selected at least one object is reduced only, on the display unit 151. Herein, the enlargement may mean 'zoom in' and the reduction may mean 'zoom out'.

For one example, the controller 180 may zoom in or zoom out the selected at least one object in a manner of comparing images captured by a plurality of cameras to each other and then complementing them with each other.

In the preview image, the controller 180 may differently process a zoom processing magnification of each of a plurality of the selected objects. For instance, the controller 180 may enlarge a first object among a plurality of the selected objects and reduce a second object. For another instance, among a plurality of the selected objects, the controller 180 may perform ×1.5 zoom processing, ×0.8 zoom processing and ×1.2 zoom processing on a first object, a second object and a third object, respectively.

The controller 180 may zoom-process the selected at least one object only, or may zoom-process the rest of the objects in the preview image except the selected at least one object. For instance, the controller 180 may zoom process the rest of the objects in the preview image except the selected at least one object, or may zoom process the rest of the objects except the selected at least one object and a background region in the preview image.

The controller 180 may display the zoom-processed image on the display unit 151 [S2840].

The controller 180 of the terminal 100 may display the preview image, in which the selected at least one object is zoom-processed, on the display unit 151. In the preview image, the controller 180 may display the zoom-processed at least one object distinguished from another object. For instance, in the preview image, the controller 180 may display an indicator indicating that the zoom-processed at least one object is zoomed in or out. For another instance, in the preview image, the controller 180 may display the zoom-processed at least one object that is highlighted.

The terminal 100 may capture the zoom-processed preview image [S2850].

The controller 180 may obtain a shot input to the preview image having the selected at least one object zoomed in or out, or capture an image, in which the at least one object is zoomed in or out, displayed in the preview image in response to a shot input. And, in response to a shot input, the controller 180 may capture an image having the selected at least one object zoomed in or out and an image, which is not zoom-processed, at an original magnification, respectively.

A detailed embodiment for the aforementioned operation of the terminal is described as follows.

Figure 29:
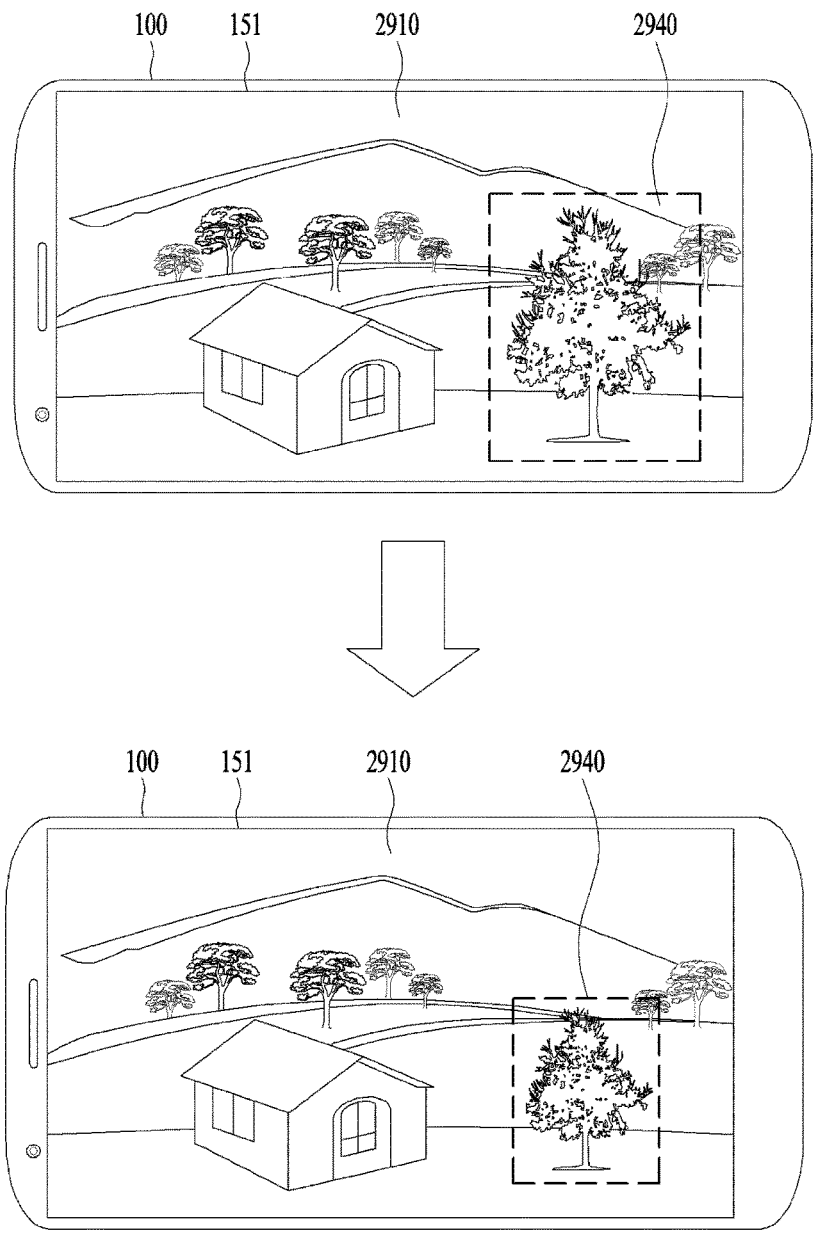
FIG. 29 is a diagram for an example of an operation of zooming in on a selected object only according to various embodiments of the present invention.

FIG. 29 is a diagram for an example of an operation of zooming in on a selected object only according to various embodiments of the present invention.

Referring to FIG. 29, the controller 180 of the terminal 100 may display a preview image 2910 captured through the camera 121 on the display unit 151. The controller 180 may obtain an input for selecting an object (e.g., tree 2940) to zoom-process from the preview image 2910. The controller 180 may obtain an input for zoom-processing (e.g., reducing) the selected tree 2940 only. The controller 180 may zoom out the tree 2940 only in the preview image 2910. And, the controller 180 may display the preview image 2910, in which the tree 2940 is zoomed out only, on the display unit 151. If obtaining a shot input, the controller 180 may capture the preview image 2910. Hence, the terminal 100 may capture an image in which the tree 2940 is zoomed out only. In response to a shot input, the terminal 100 may simultaneously capture each of the image 2940 having the tree 2940 zoomed out only and an image, in which the tree 2940 is not zoom-processed, at an original magnification.

Detailed embodiments for an input for zoom-processing a selected object are described with reference to FIGS. 30 to 32.

Figure 30:
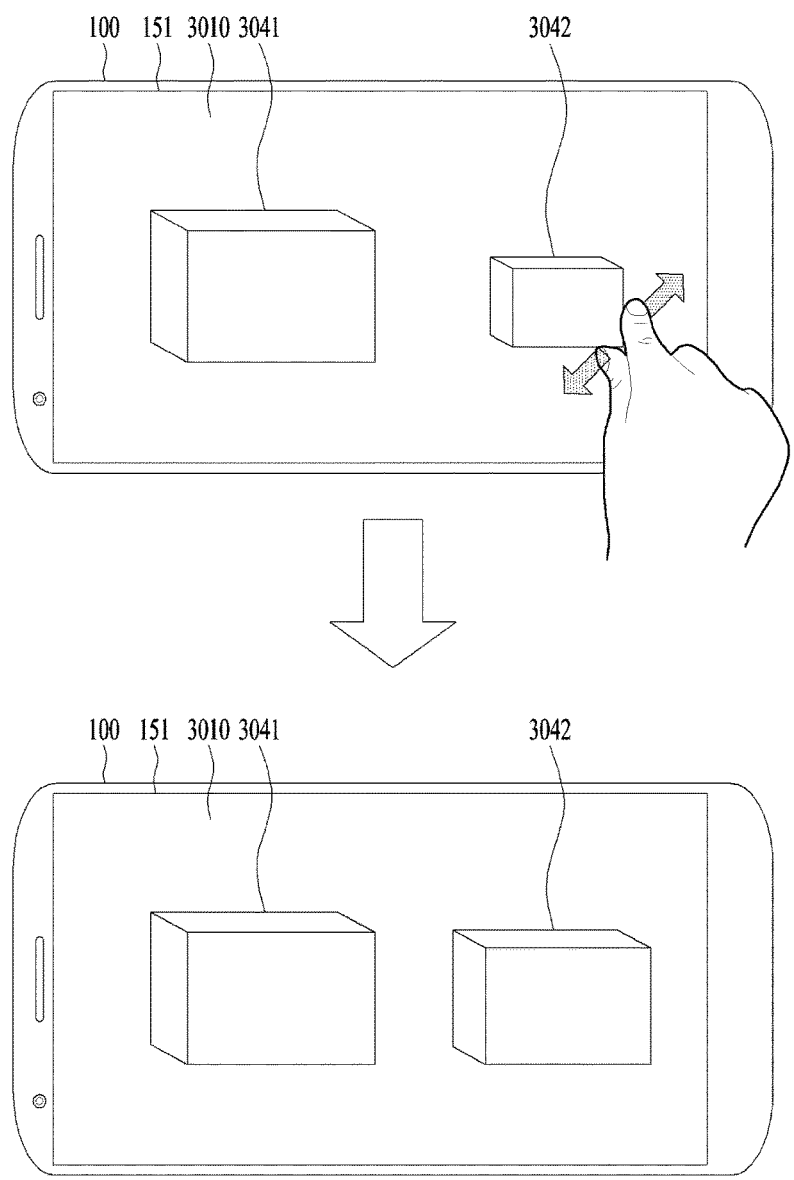
FIG. 30 is a diagram for an example of a zoom processing input according to various embodiments of the present invention.

FIG. 30 is a diagram for an example of a zoom processing input according to various embodiments of the present invention.

Referring to FIG. 30, the controller 180 of the terminal 100 may display a preview image 3010 captured through the camera 121 on the display unit 151. The controller 180 may display the preview image 3010 captured through the camera 121, in which a first object 3041 and a second object 3042 are displayed, on the display unit 151. The controller 180 may obtain an input of zooming in the second object 3042, e.g., an input of pinching out the second object 3042. Meanwhile, before obtaining the input of pinching output the second object 3042, the controller 180 may obtain an input for selecting the second object 3042, e.g., an input of long touching the second object 3042. In response to the obtained input, the controller 180 may enlarge the second object 3042 only in the preview image 3010. Hence, the controller 180 may display a preview image, in which the second object 3042 is zoomed in only by being selected from the first and second objects 3041 and 3042 contained in the preview image 3010, on the display unit 151. Thus, the terminal 100 can obtain an intuitive touch input such as a pinch-in or a pinch-out from the preview image as an input for zoom-processing the selected at least one object only. If obtaining a shot input, the terminal 100 may capture an image having the second object 3042 zoomed in only. And, the controller 180 may simultaneously capture an image, in which the second object 3042 is not zoomed in, at an original magnification as well.

Figure 31:
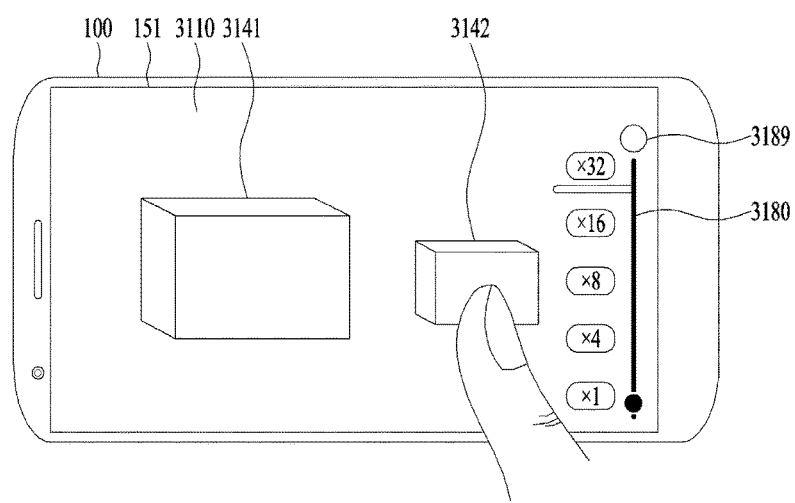
FIG. 31 is a diagram for an example of a zoom slide display for a selected object according to various embodiments of the present invention.

FIG. 31 is a diagram for an example of a zoom slide display for a selected object according to various embodiments of the present invention.

Referring to FIG. 31, the controller 180 of the terminal 100 may display a preview image 3110 captured through the camera 121 on the display unit 151. For instance, the controller 180 may display the preview image 3110 captured through the camera 121, in which a first object 3141 and a second object 3142 are displayed. The controller 180 may obtain an input for selecting the second object 3142, e.g., an input of long touching the second object 3142. The controller 180 may display a zoom slide 3180 for zooming in/out the selected second object 3142. In response to an input to the zoom slide 3180, the controller 180 may zoom-process the selected second object 3142. For instance, if obtaining an input to the zoom slide 3180, e.g., an input for 4× enlargement, the controller 180 can display the second object 3142 by 4×-enlarging the selected second object 3142 only. The controller 180 may display a smart zoom button 3189 on the zoom slide 3180. Herein, the smart zoom button 3189 may include a button for zoom-processing the second object 3142, which is the selected object, at an optimal magnification. Herein, the optimal magnification corresponding to the smart zoom may include a magnification at which the selected second object 3142 can be displayed in a maximal size displayable on the display unit 151. If the selected second object 3142 is displayed in the maximal size displayable on the display unit 151, it may correspond to a maximal size considering another object in the preview image 3110 or a maximal size failing to consider another object in the preview image 3110. Hence, the optimal magnification corresponding to the smart zoom may include a maximal size in which the selected second object 3142 can be simply displayed on the display unit 151 or a maximal size failing to block another object included in the preview image 3110. The smart zoom is described in detail with reference to FIG. 32.

Figure 32:
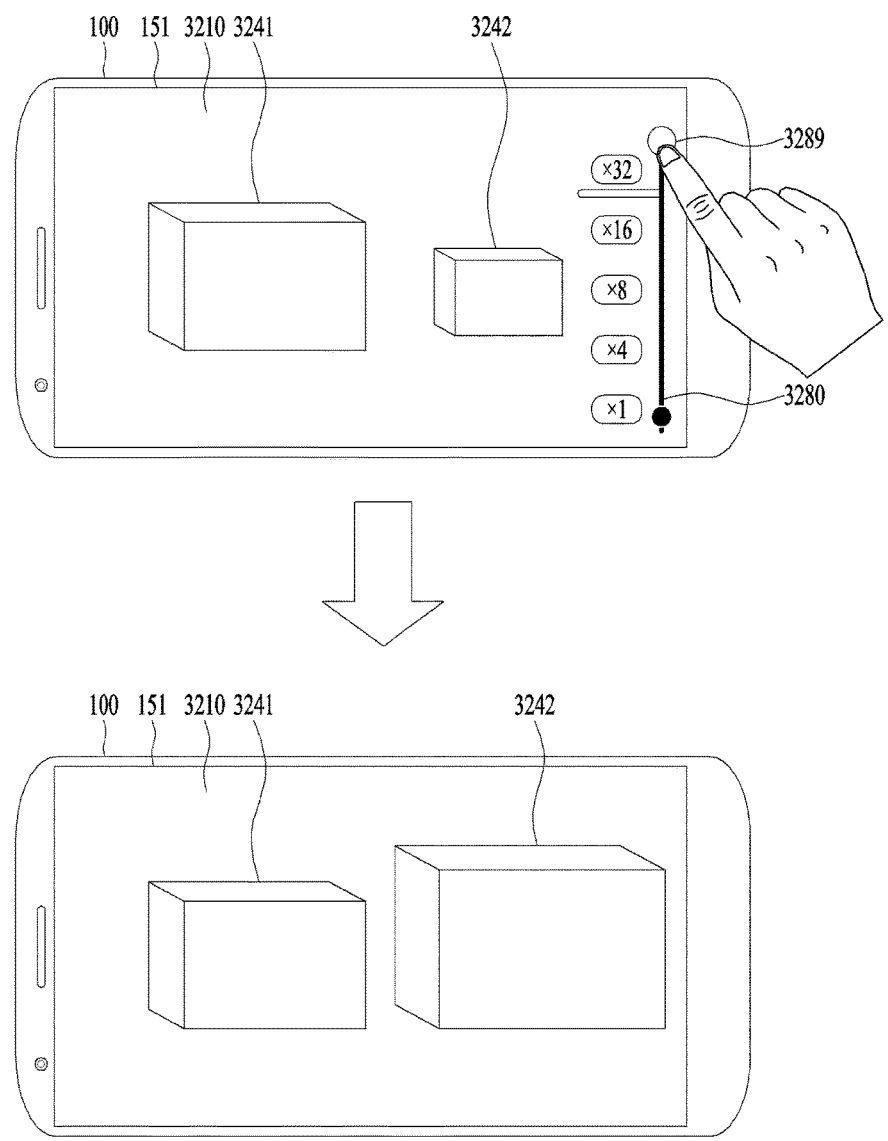
FIG. 32 is a diagram for an example of a smart zoom according to various embodiments of the present invention.

FIG. 32 is a diagram for an example of a smart zoom according to various embodiments of the present invention.

Referring to FIG. 32, the controller 180 of the terminal 100 may display a preview image 3210 captured through the camera 121 on the display unit 151. For instance, the controller 180 may display the preview image 3210 captured through the camera 121, in which a first object 3241 and a second object 3242 are displayed. The controller 180 may obtain an input for selecting the second object 3242, e.g., an input of long touching the second object 3242. The controller 180 may display a zoom slide 3280 for zooming in/out the selected second object 3242 and also display a smart zoom button 3289 on the zoom slide 3280. If obtaining an input for selecting the smart zoom button 3289, the controller 180 may zoom-process the selected second object 3242 at an optimal magnification, e.g., in a maximal size. For instance, within a range enough not to block the first object 3241, the controller 180 may zoom in the second object 3242 only so that the second object 3242 can be displayed in a largest size. The controller 180 may display the preview image 3210, in which the second object 3242 is zoomed in only without zoom-processing the first object 3241, on the display unit 151. If obtaining a shot input, the controller 180 may capture an image in which the second object 3242 is zoomed in only. And, the controller 180 may simultaneously capture an image at an original magnification, in which the second object 3242 is not zoomed in.

The terminal 100 according to various embodiments of the present invention can zoom-process a plurality of objects contained in a preview image in a manner of differentiating a zoom magnification of each of the objects. This is described with reference to FIG. 8.

Figure 33:
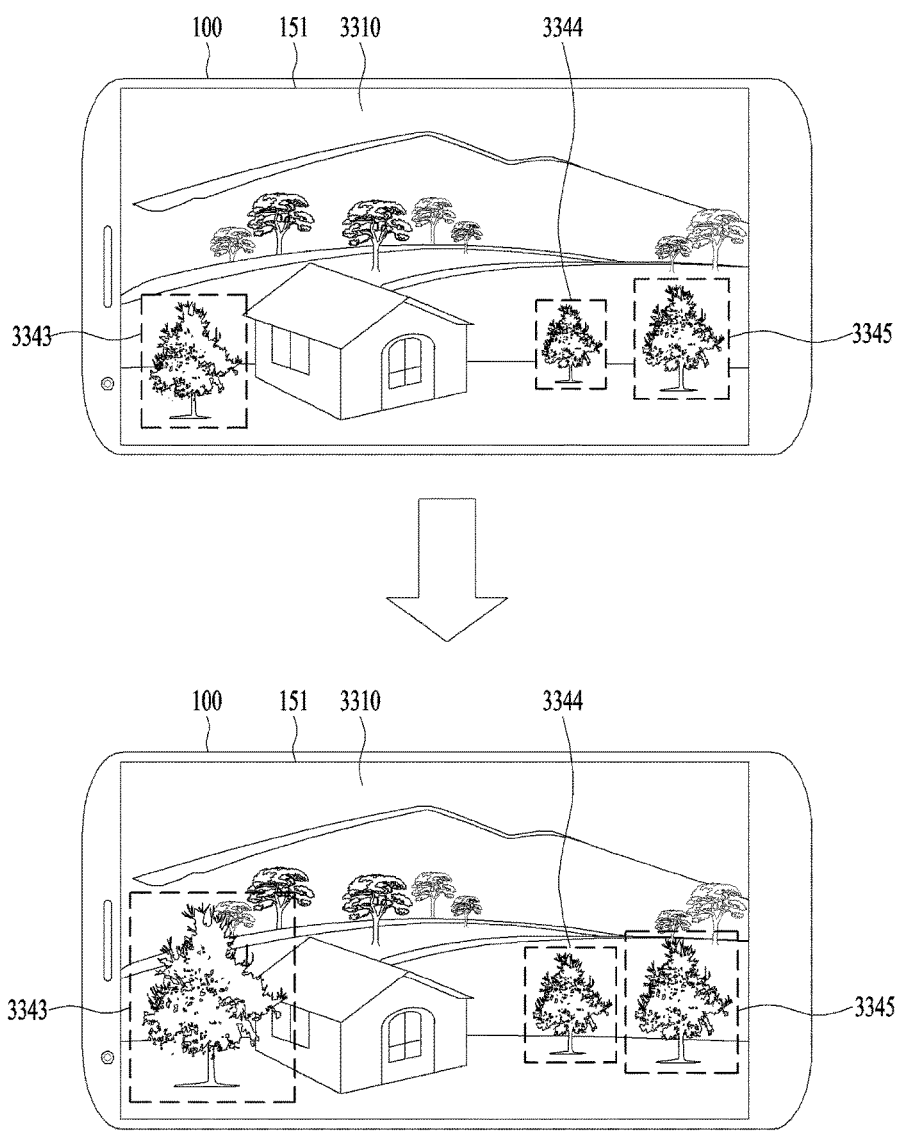
FIG. 33 is a diagram for an example of a zoom processing operation for a plurality of objects according to various embodiments of the present invention.

FIG. 33 is a diagram for an example of a zoom processing operation for a plurality of objects according to various embodiments of the present invention.

Referring to FIG. 33, the controller 180 of the terminal 100 may display a preview image 3310 captured through the camera 121 on the display unit 151. For instance, the controller 180 may display the preview image 3310 captured through the camera 121, in which first to third trees 3343 to 3345 are contained, on the display unit 151. The controller 180 may receive an input for differentiating zoom magnifications of the first to third trees 3343 to 3345 in the preview image 3310. For instance, the controller 180 may obtain an input for zoom-processing the first to third trees 3343 to 3345 by ×1.5, ×0.7 and ×0.8, respectively. In response to the obtained input, the controller 180 can zoom-process the first to third trees 3343 to 3345 by ×1.5, ×0.7 and ×0.8, respectively. And, the controller 180 can display the preview image 3310, in which the first to third trees 3343 to 3345 are zoom-processed at different magnifications, respectively, on the display unit 151. If obtaining an image shot input, the terminal 100 may capture an image in which the first to third trees 3343 to 3345 are zoom-processed at different magnifications, respectively. Moreover, the terminal 100 may simultaneously capture an image in which the first to third trees 3343 to 3345 are zoom-processed at different magnifications, respectively and an image at an original magnification. Thus, the terminal 100 may process a preview image by differentiating a zoom magnification of each of a plurality of objects contained in the preview image and then capture a zoom-processed image.

Detailed embodiments of an input for zoom-processing each of a plurality of selected objects are described with reference to FIGS. 34 to 36.

Figure 34:
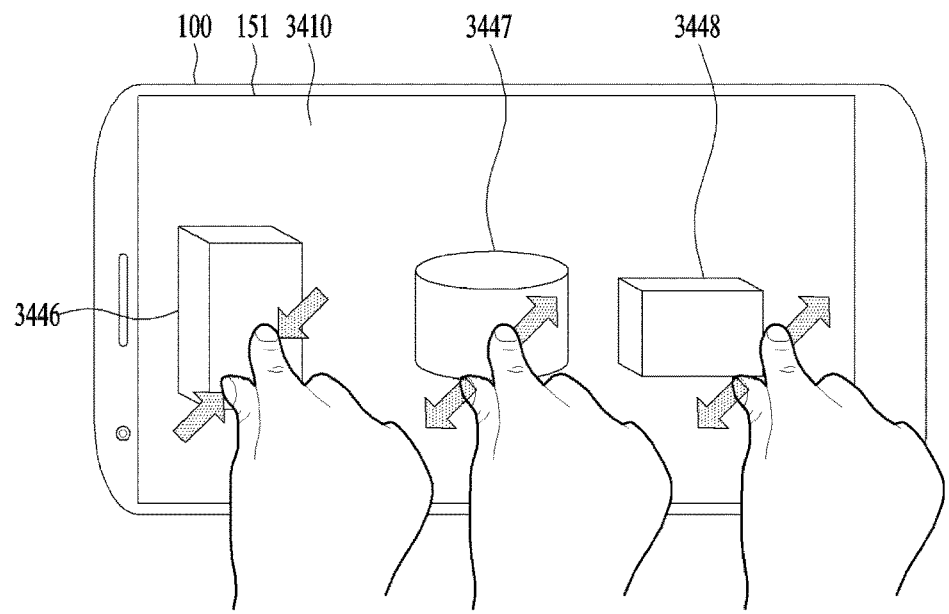
FIG. 34 is a diagram for an example of a zoom processing input according to various embodiments of the present invention.
Figure 34:
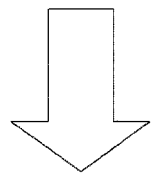
Figure 34:
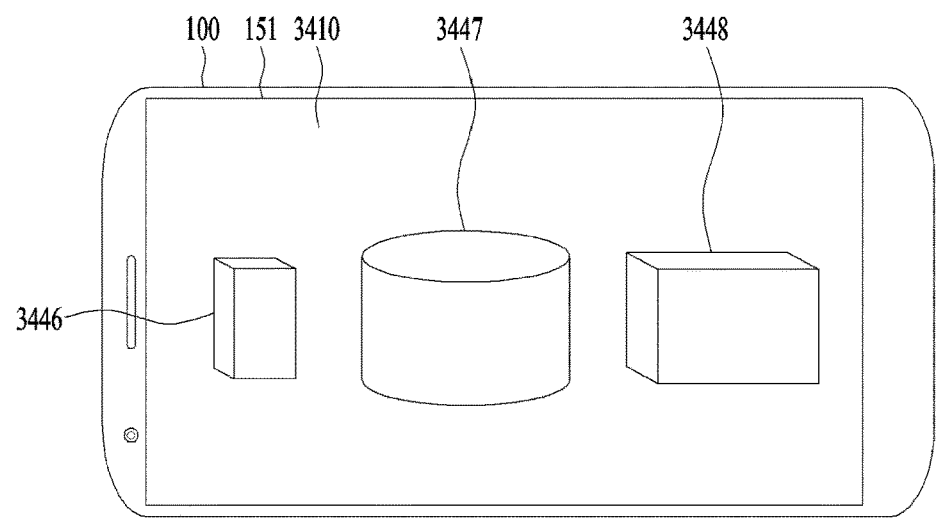

FIG. 34 is a diagram for an example of a zoom processing input according to various embodiments of the present invention.

Referring to FIG. 34, the controller 180 of the terminal 100 may display a preview image 3410 captured through the camera 121 on the display unit 151. For instance, the controller 180 may display the preview image 3410 captured through the camera 121, in which first to third objects 3446 to 3448 are contained, on the display unit 151. The controller 180 may receive an input for zoom processing a plurality of objects displayed in the preview image 3410 at different magnifications. For instance, the controller 180 may obtain an input of pinching in the first object 3446 as an input for zooming out the first object 3446, an input of pinching out the second object 3447 as an input for zooming in the second object 3447, and an input of pinching out the third object 3448 as an input for zooming in the third object 3448. Meanwhile, before obtaining the input of pinching in or out each of the first to third objects 3446 to 3448, the controller 180 may obtain an input for selecting each of the first to third objects 3446 to 3448, e.g., an input of long touching each of the objects. In response to the obtained input, the controller 180 can enlarge the second object 3442 only in the preview image 3410. In response to the obtained pinch-in or -out input, the controller 180 may zoom-process each of the first to third objects 3446 to 3448 contained in the preview image 3410. For instance, the controller 180 may zoom-process the first to third objects 3446 to 3448 by ×0.6, ×1.3 and ×1.4, respectively. Herein, the zoom-processed magnification may correspond to the pinch-in or -out input. The controller 180 may display the zoom-processed preview image on the display unit 151. Thus, the terminal 100 may obtain such an intuitive touch input as a pinch-in or a pinch-out as an input for zoom-processing each of a plurality of the selected objects from the preview image. If obtaining a shot input, the terminal may capture an image in which a plurality of the first to third objects 3446 to 3448 are zoom-processed at different magnifications, respectively. Moreover, the controller 180 may simultaneously capture an image at an original magnification, in which a plurality of the objects 3446 to 3448 are not zoomed in.

Figure 35:
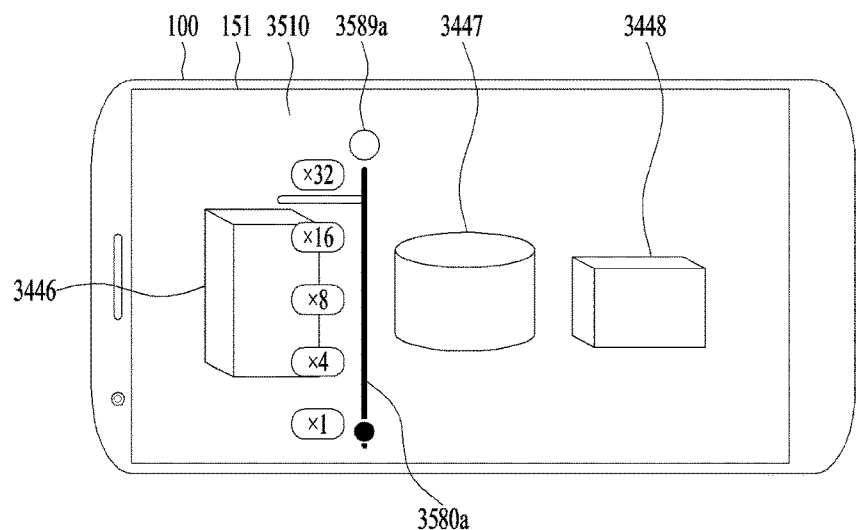
FIG. 35 and FIG. 36 are diagrams for examples of a zoom slide display for a selected object according to various embodiments of the present invention.
Figure 36:
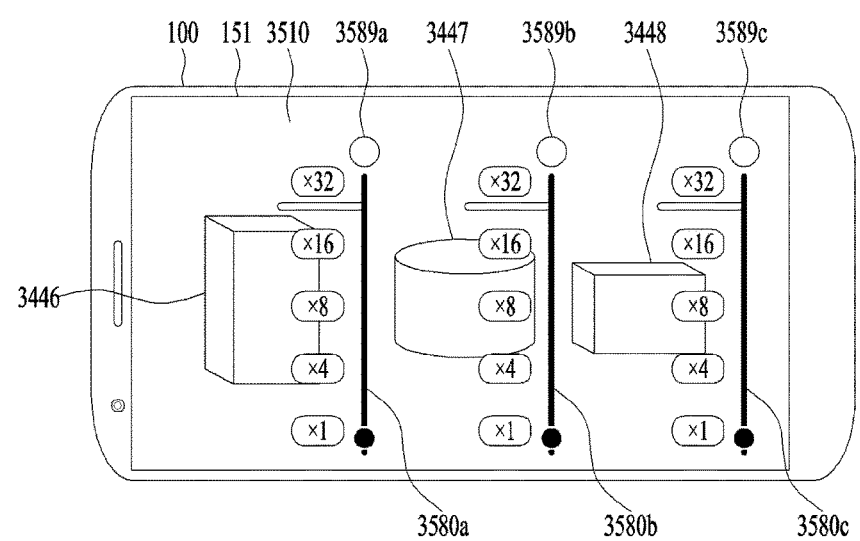

FIG. 35 and FIG. 36 are diagrams for examples of a zoom slide display for a selected object according to various embodiments of the present invention.

Referring to FIG. 35, the controller 180 of the terminal 100 may display a preview image 3510 captured through the camera 121 on the display unit 151. For instance, the controller 180 may display the preview image 3510 captured through the camera 121, in which first to third objects 3546 to 3548 are contained, on the display unit 151. The controller 180 may display a zoom slide 3580a for a selected one of the first to third objects 3546 to 3548 corresponding to a plurality of objects to be zoom-processed, e.g., the first object 3546 only, and may then receive an input of a zoom processing magnification for the first object 3546 as an input to the zoom slide 3580a. if receiving the input of the zoom processing magnification for the first object 3546, the controller 180 may sequentially receive a zoom processing magnification for each of the second object 3547 and the third object 3548 through an input to the zoom slide 3580a. The controller 180 may display an object, which receives an input of a zoom processing magnification as an input to the zoom slide 3580a, in a manner of distinguishing the corresponding object from other objects. For instance, if receiving an input of a zoom processing magnification of the first object 3446 through the zoom slide 3580a, the controller 180 can display the first to third objects 3546 to 3548 in a manner of distinguishing the first object 3446 from other objects 3447 and 3448. For example, the controller 180 can display the first object 346, which can receive a zoom processing magnification through the zoom slide 3580a, by highlighting the first object 346. Thus, the terminal 100 can sequentially receive zoom processing magnifications of a plurality of objects through the displayed zoom slide 3580a. Meanwhile, the controller 180 may display a smart zoom button 3589a on the zoom slide 3580a and then zoom-process a selected object at a magnification corresponding to the smart zoom in response to an input to the smart zoom button 3589a. This has been already mentioned in the foregoing description and its details shall be omitted.

Referring to FIG. 36, the controller 180 of the terminal 100 may display a preview image 3510 captured through the camera 121 on the display unit 151. For instance, the controller 180 may display the preview image 3510 captured through the camera 121, in which first to third objects 3446 to 3448 are contained, on the display unit 151. The controller 180 may display zoom slides 3589a to 3589c for the first to third objects 3446 to 3448 corresponding to a plurality of objects to be zoom-processed, respectively. In response to inputs to a plurality of the zoom slides 3589a to 3589c, the controller 180 may zoom-process a plurality of the objects 3446 to 3448, respectively. The controller 180 may display a preview image 3510, in which each of a plurality of the objects 3446 to 3448 is zoom-processed, on the display unit 151. Thus, the terminal 100 may display a zoom slide for each of a plurality of objects to be zoom-processed and then zoom-process each of a plurality of the objects in response to an input to each of the displayed zoom slides. Meanwhile, the controller 180 may display smart zoom buttons 3589a to 3589c on a plurality of the zoom slides 3580a to 3580c, respectively and then zoom-process only an object, which is selected in response to an input to each of the smart zoom buttons 3589a to 3589c, at a magnification corresponding to a smart zoom. This has been already mentioned in the foregoing description and its details shall be omitted.

Detailed embodiments are described with reference to FIG. 37 and FIG. 38.

Figure 37:
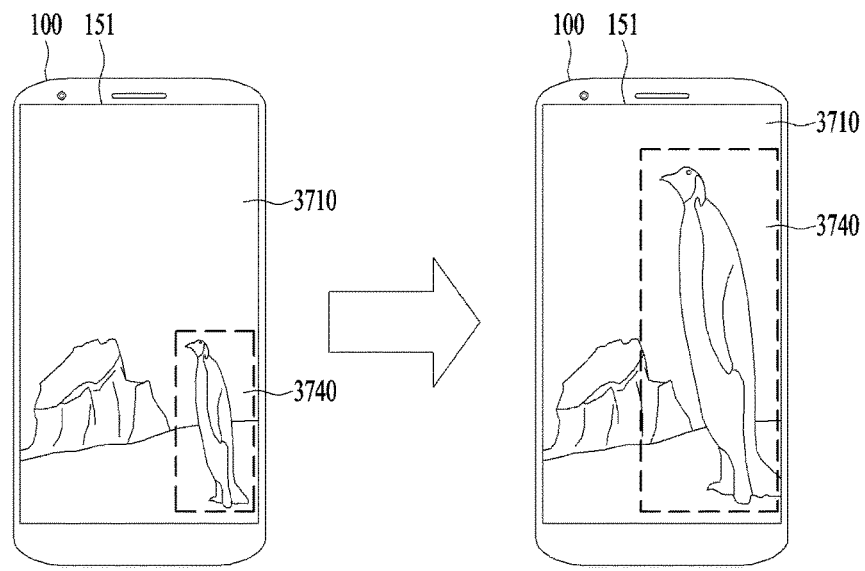
FIG. 37 and FIG. 38 are diagrams to illustrate a preview image of zoom-processing a selected object only according to various embodiments of the present invention.
Figure 38:
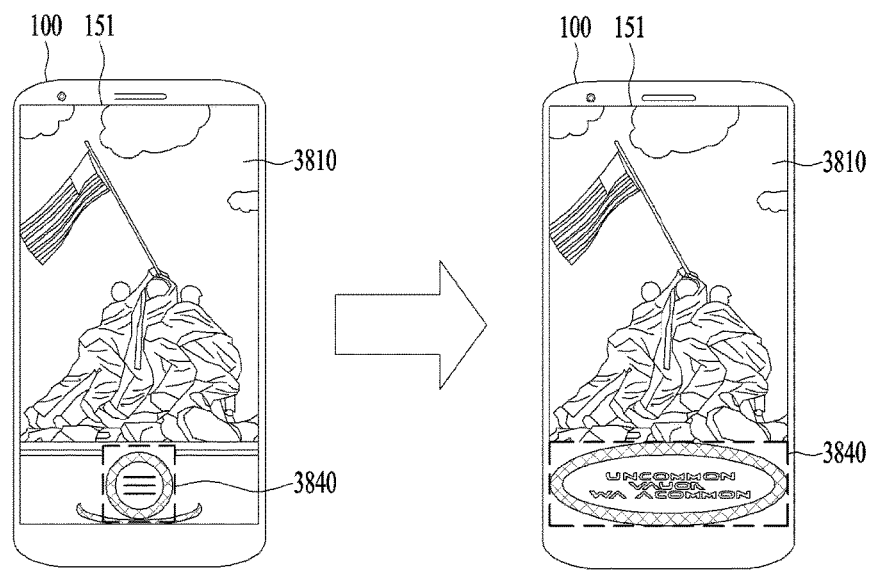

FIG. 37 and FIG. 38 are diagrams to illustrate a preview image of zoom-processing a selected object only according to various embodiments of the present invention.

Referring to FIG. 37, the controller 180 of the terminal 100 may display a preview image 3510 captured through the camera 121 on the display unit 151. For instance, the controller 180 may display a preview image 3710 for a glacier and a penguin 3740 captured through the camera 121 on the display unit 151. The controller 180 may obtain an input of selecting the penguin 3740 from the preview image 3710 and then zooming in the selected penguin 3740 only. The controller 180 may display the preview image 3710 having the penguin 3740 zoomed in only on the display unit 151. Since the selected penguin 3740 is zoomed in only, the rest of region and object (e.g., glacier) of the preview image 3710 may not be zoom-processed. And, the terminal 100 may capture an image having the penguin 3740 zoomed in only. Thus, the terminal 100 may display a preview image having a selected object zoom-processed only and then capture an image having the selected object zoom-processed only.

Referring to FIG. 38, the controller 180 of the terminal 100 may display a preview image 3510 captured through the camera 121 on the display unit 151. For instance, the controller 180 may display a preview image 3810 for a bronze statue of soldiers captured through the camera 121 on the display unit 151. The controller 180 may obtain an input of selecting a bronze statue name plate 3840 from the preview image 3810 and then zooming in the selected bronze statue name plate 3840 only. The controller 180 may display the preview image 3810 having the bronze statue name plate 3840 zoomed in only on the display unit 151. Since the selected bronze statue name plate 3840 is zoomed in only, the rest of region and object of the preview image 3810 may not be zoom-processed. And, the terminal 100 may capture an image having the bronze statue name plate 3840 zoomed in only. Thus, the terminal 100 may display a preview image having a selected object zoom-processed only and then capture an image having the selected object zoom-processed only.

The terminal 100 according to various embodiments of the present invention can delete a selected object not to be displayed in a preview image. And, the terminal 100 may return an object enlarged or reduced by the aforementioned zoom processing into an original magnification. For instance, if obtaining an input of swiping a preview image in a horizontal direction, the controller 180 can delete all selected objects from the preview image. For another instance, if obtaining an input of swiping a preview image in a vertical direction, the controller 180 can display zoom-processed objects at an original magnification. And, the controller 180 may display a magnification resetting indicator for returning a magnification of each of a plurality of objects selected from a preview image to an original magnification and a deleting indicator for a deletion from the preview image. Moreover, in response to an input to the displayed magnification resetting indicator or the displayed deleting indicator, the controller 180 may return a magnification of a selected object to an original magnification or delete the selected object from the preview image. This is described with reference to FIG. 39.

Figure 39:
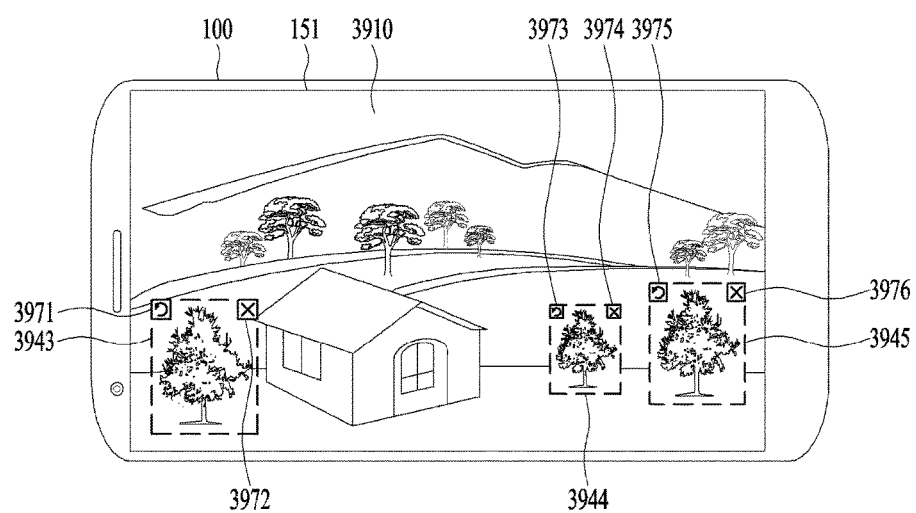
FIG. 39 is a diagram for an example of magnification resetting and deletion of a selected object according to various embodiments of the present invention.

FIG. 39 is a diagram for an example of magnification resetting and deletion of a selected object according to various embodiments of the present invention.

Referring to FIG. 39, the controller 180 of the terminal 100 may display a preview image 3910 captured through the camera 121 on the display unit 151. For instance, the controller 180 may display the preview image 3910 captured through the camera 121, in which first to third trees 3943 to 3945 are contained, on the display unit 151. The controller 180 may mark the first to third trees 3943 to 3945 with magnification resetting indicators 3971, 3973 and 3975 and deleting indicators 3972, 3974 and 3976 in the preview image 3910, respectively. In response to an input to the displayed magnification resetting indicator 3971/3973/3975 and the displayed deleting indicator 3972/3974/3976, the controller 180 may return a magnification of a selected object to an original magnification or delete the selected object from the preview image. For instance, if obtaining an input for selecting the first reset indicator 3971, the controller 180 may return a magnification of the first tree 3943 to an original magnification and display the first tree 3943 at the original magnification in the preview image 3910. For another instance, if obtaining an input for selecting the third deleting indicator 3976, the controller 180 may delete the third tree 3943 from the preview image 3910. Thus, the terminal 100 may return a magnification of a selected object or delete a selected object from a preview image, in response to an input to the displayed resetting or deleting indicator.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal comprising:
   a display unit;
   a camera configured to capture an image; and
   a controller configured to:
   display a preview image captured through the camera on the display unit,
   display a UI (User Interface) for zoom processing the preview image on the preview image, wherein the UI represents a plurality of zoom magnification values and includes a zoom button for changing a zoom magnification value,
   when an object is selected from the preview image, determine a maximal magnification value for the selected object to be displayed in a maximal size on the display unit,
   display an indicator indicating the determined zoom magnification value on the UI, wherein the indicator is displayed at a zoom magnification value corresponding to the determined zoom magnification value among the plurality of zoom magnification values,
   when the zoom button is selected, zoom process the preview image centering on the selected object based on the determined zoom magnification value, and display the zoom-processed preview image on the display unit.

2. The terminal of claim 1, wherein the controller is configured to control an original preview image before the zoom processing to be displayed on the zoom-processed preview image.

3. The terminal of claim 2, wherein the controller is further configured to capture at least one of the zoom-processed image and the original preview image.

4. The terminal of claim 1, wherein the controller is further configured to obtain an input for selecting a plurality of objects from the preview image and to control a plurality of zoom regions respectively generated from zoom-processing a plurality of the selected objects to be displayed on the display unit.

5. The terminal of claim 4, wherein the controller is further configured to simultaneously capture the zoom-processed image and each of a plurality of the zoom regions.

6. The terminal of claim 1, wherein the controller is further configured to track the selected object in the preview image and to control the display unit to display the selected object at a center of the zoom-processed preview image.

7. A method of operating a terminal, comprising:
displaying a preview image captured through a camera;
displaying a UI (User Interface) for zoom processing the preview image on the preview image, wherein the UI represents a plurality of zoom magnification values and includes a zoom button for changing a zoom magnification value;
when an object is selected from the preview image, determining a maximal magnification value for the selected object to be displayed in a maximal size on the display unit;
displaying an indicator indicating the determined zoom magnification value on the UI, wherein the indicator is displayed at a zoom magnification value corresponding to the determined zoom magnification value among the plurality of zoom magnification values;
when the zoom button is selected, zoom processing the preview image centering on the selected object based on the determined zoom magnification value; and
displaying the zoom-processed preview image on the display unit.

8. The method of claim 7, further comprising displaying an original preview image before the zoom processing.

9. The method of claim 8, further comprising capturing at least one of the zoom-processed image and the original preview image.

10. The method of claim 7, further comprising:
obtaining an input for selecting a plurality of objects from the preview image;
displaying a plurality of zoom regions respectively generated from zoom-processing a plurality of the selected objects.

11. The method of claim 10, further comprising simultaneously capturing the zoom-processed image and each of a plurality of the zoom regions.

12. The method of claim 7, further comprising tracking the selected object in the captured preview image, wherein the displaying the zoom-processed preview image comprises displaying the selected object at a center of the zoom-processed preview image.

* * * * *